US007610330B1

(12) United States Patent
Quinn et al.

(10) Patent No.: US 7,610,330 B1
(45) Date of Patent: Oct. 27, 2009

(54) MULTI-DIMENSIONAL COMPUTATION DISTRIBUTION IN A PACKET PROCESSING DEVICE HAVING MULTIPLE PROCESSING ARCHITECTURE

(75) Inventors: Michael J. Quinn, Campbell, CA (US);
Scott A. Hankins, Cupertino, CA (US);
Paul Leslie Archard, Kelowna (CA);
James J. Stabile, Los Altos, CA (US)

(73) Assignee: Packeteer, Inc., Cupertino, CA (US)

( * ) Notice: Subject to any disclaimer, the term of this patent is extended or adjusted under 35 U.S.C. 154(b) by 394 days.

(21) Appl. No.: 11/396,070

(22) Filed: Mar. 30, 2006

(51) Int. Cl.
*G06F 15/16* (2006.01)
(52) U.S. Cl. .................. 709/201; 709/203; 709/206; 709/207
(58) Field of Classification Search .................. 709/201, 709/219, 251, 220, 221, 203, 206, 207
See application file for complete search history.

(56) References Cited

U.S. PATENT DOCUMENTS

| | | | | |
|---|---|---|---|---|
| 5,991,300 | A * | 11/1999 | Tappan | 370/392 |
| 6,633,835 | B1 | 10/2003 | Moran et al. | |
| 7,248,585 | B2 | 7/2007 | Kohn et al. | 370/392 |
| 2001/0023453 | A1* | 9/2001 | Sundqvist | 709/232 |
| 2002/0107903 | A1* | 8/2002 | Richter et al. | 709/201 |
| 2003/0081615 | A1* | 5/2003 | Kohn et al. | 370/395.42 |
| 2003/0097461 | A1* | 5/2003 | Barham et al. | 709/235 |
| 2003/0187914 | A1* | 10/2003 | Kaniyar et al. | 709/201 |
| 2004/0170156 | A1* | 9/2004 | O'Neill | 370/349 |
| 2005/0220011 | A1 | 10/2005 | Parker et al. | |

OTHER PUBLICATIONS

"Introduction to Software Specifications and Data Flow Diagrams" http://www.cs.arizona.edu/classes/cs436/spring07/Lectures/IntroDFD.pdf.*
"ARC processor core" http://www.fujitsu.com/downloads/MICRO/fma/pdf/arc_rev3.pdf.*
Pendery, D. and Eunice, J., Infiniband Architecture: Bridge Over Troubled Waters. Infiniband Trade Association [online], Apr. 27, 2000 [retrieved on Jul. 3, 2006]. Retrieved from the Internet:<http://www.infinibandta.org/newsroom/whitepapers/illuminata.pdf>.
Mellanox Technologies Inc., Infiniband in the Internet Data Center. Infiniband Trade Association [online], Jan. 16, 2002 [retrieved on Jul. 3, 2006]. Retrieved from the Internet:<http://www.infinibandta.org/newsroom/whitepapers/mellanox_idc_0102.pdf>.

(Continued)

*Primary Examiner*—Salad Abdullahi
*Assistant Examiner*—Randy Scott
(74) *Attorney, Agent, or Firm*—Baker Botts L.L.P.

(57) ABSTRACT

Flow-aware task distribution in network devices having multiple processor architectures. In one embodiment, the present invention can be used for high bandwidth network processing in an application and flow aware Quality of Service (QoS) network device. In some implementations, the present invention provides a task distribution architecture capable of flow state awareness and link level QoS control. In some implementations, the present invention can incorporate one or more processes, such as flow distributors and device distributors, that route packets for processing among different processing units on the basis flow correspondence and/or link or network path attributes. The flow and device distributors, in one implementation, allow for the separation and parallelization of packet processing functionality into flow-specific and link-specific processing units, allowing for a highly-scalable, flow-aware task distribution in a network device that processes network application traffic.

16 Claims, 22 Drawing Sheets

OTHER PUBLICATIONS

Mellanox Technologies Inc., Introduction to Infiniband. Infiniband Trade Association [online], Dec. 17, 2001 [retrieved on Jul. 3, 2006]. Retrieved from the Internet:<http://www.infinibandta.org/newsroom/whitepapers/intro_to_infiniband_1207.pdf>.

Bozman, J and Turner, V., Infiniband Architecture Transforming I/O Technology An IDS White Paper. Mellanox Technologies Inc. [online], Jan. 2001 [retrieved on Jul. 3, 2006]. Retrieved from the Internet:<http://www.mellanox.com/pdf/whitepapers/idc_whitepaper_0101.pdf>.

* cited by examiner

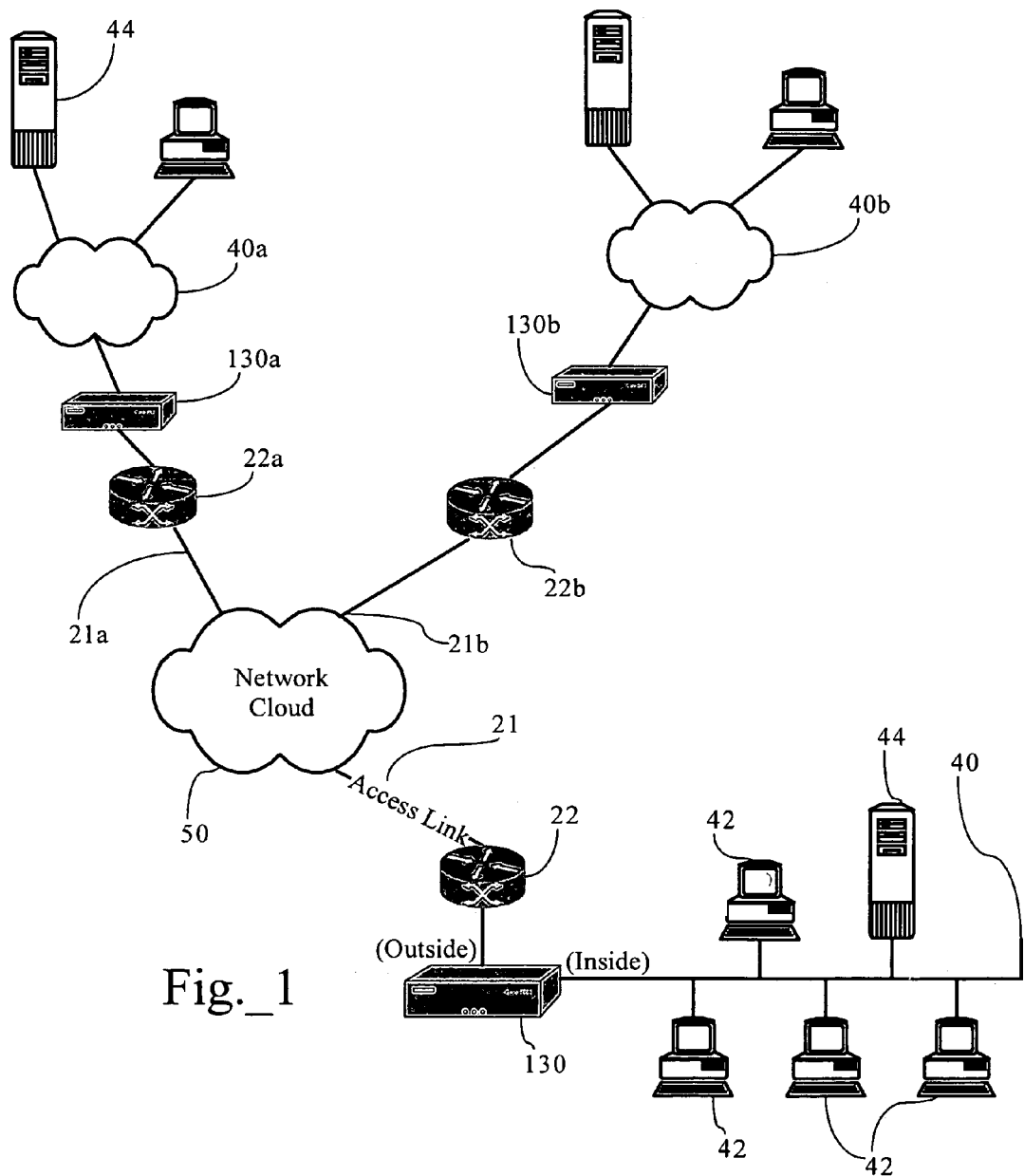
Fig._1

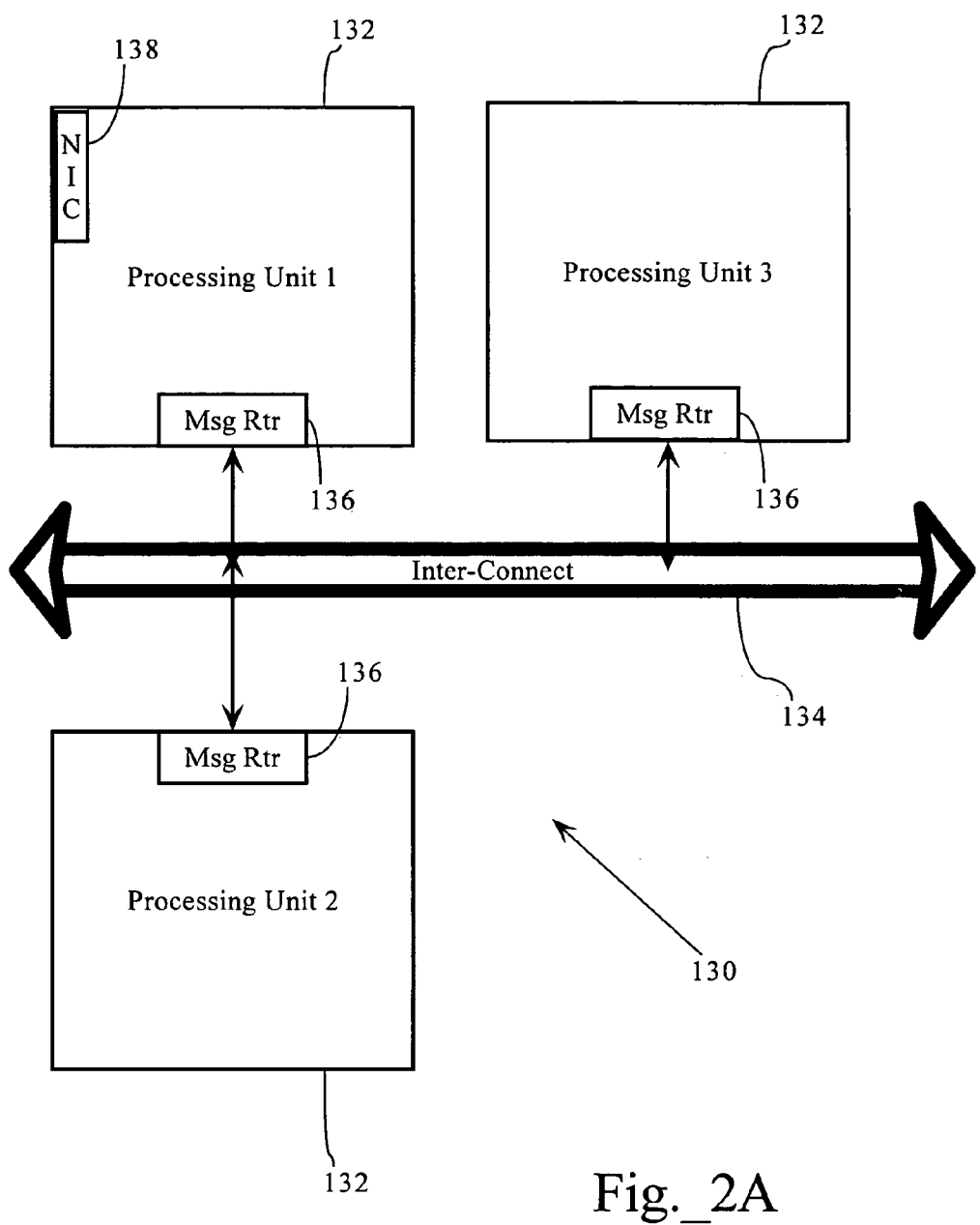
Fig._2A

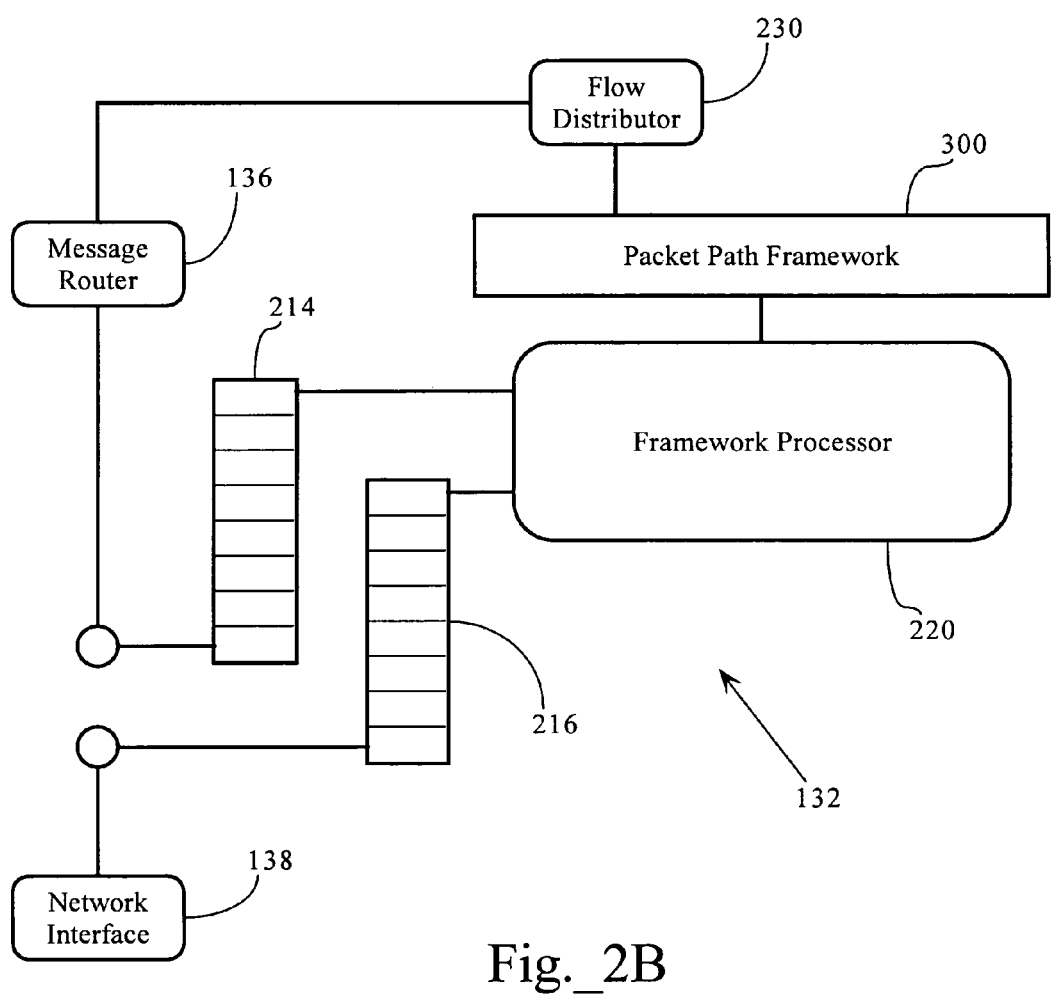
Fig._2B

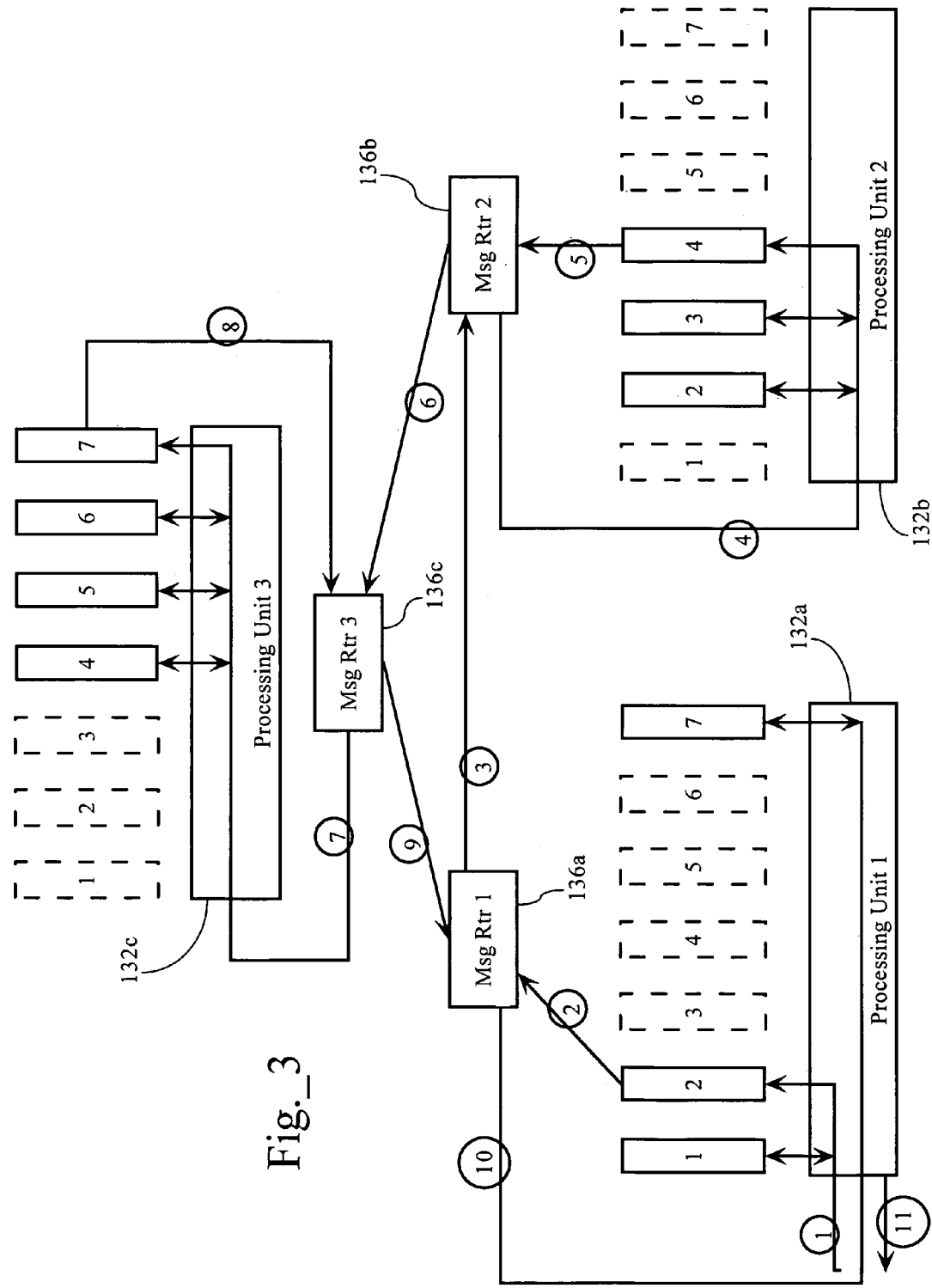
Fig._3

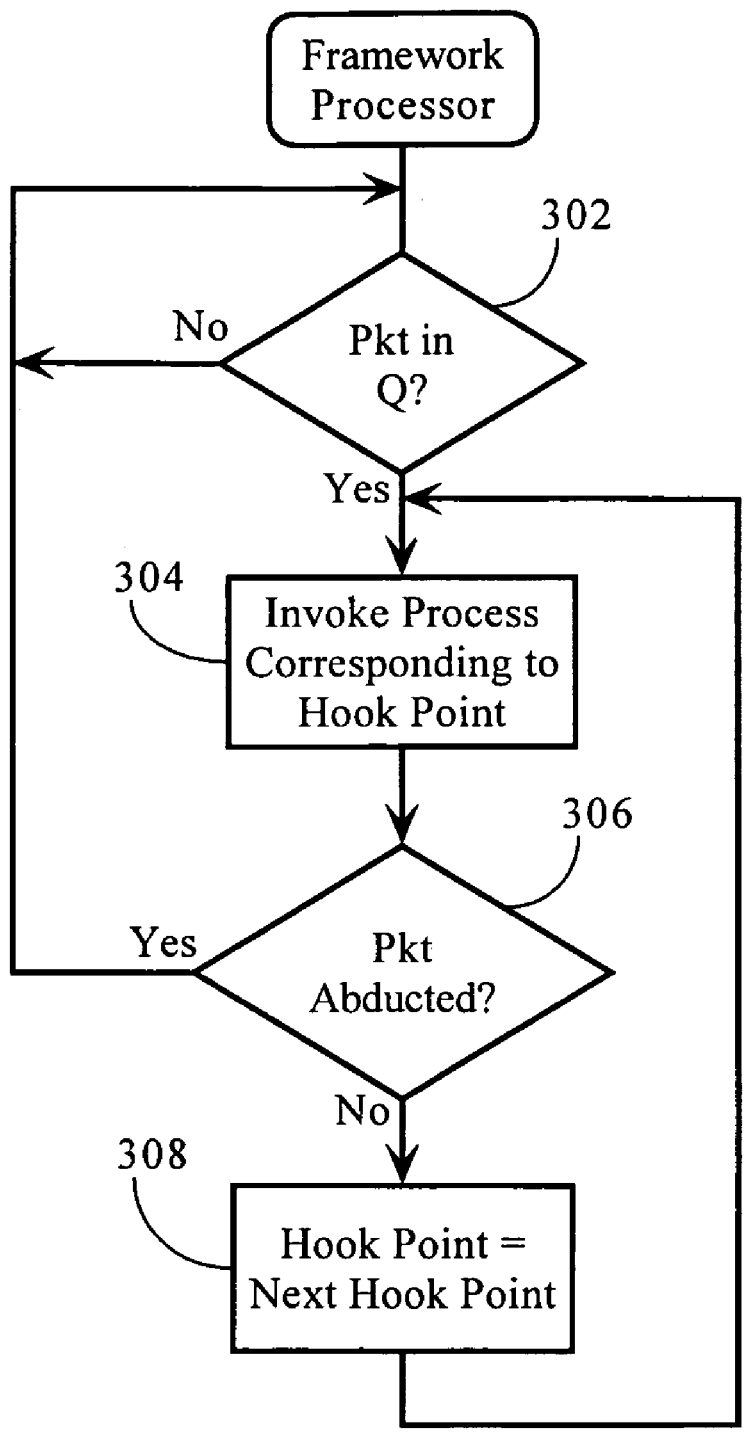
Fig._4

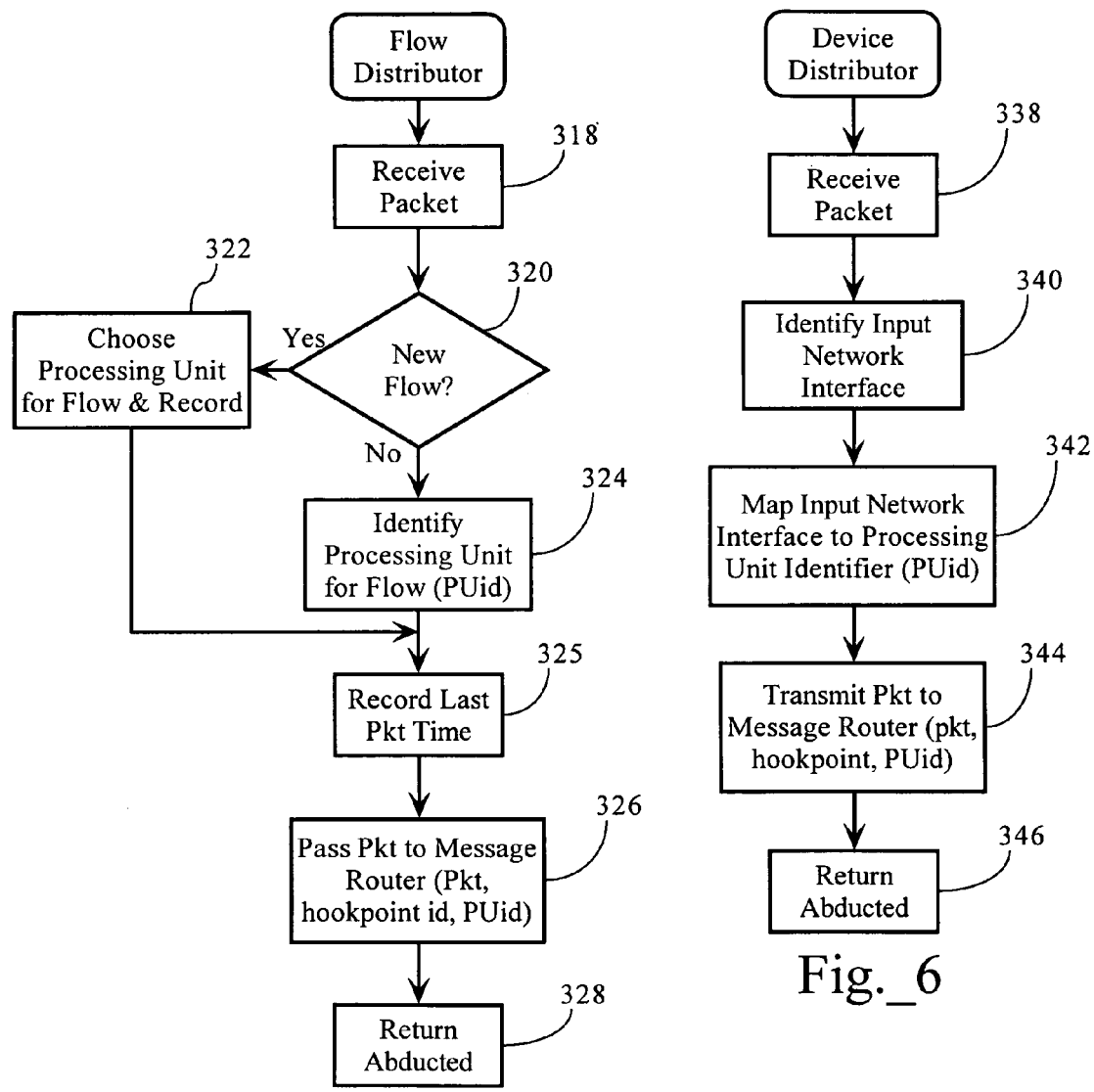

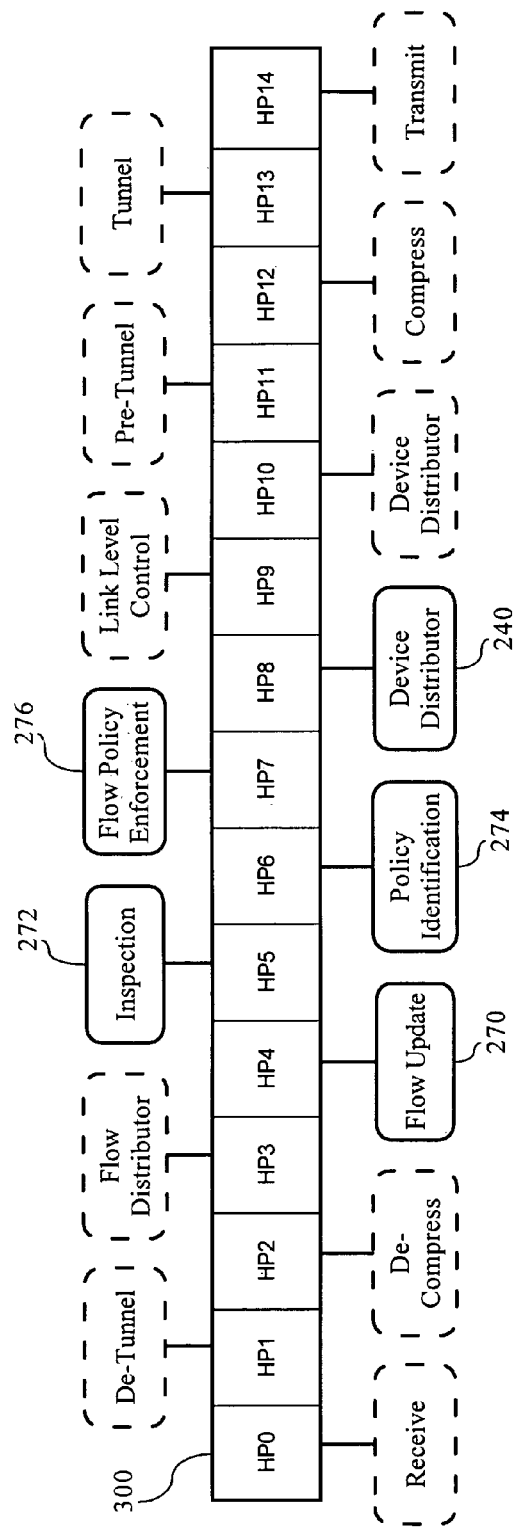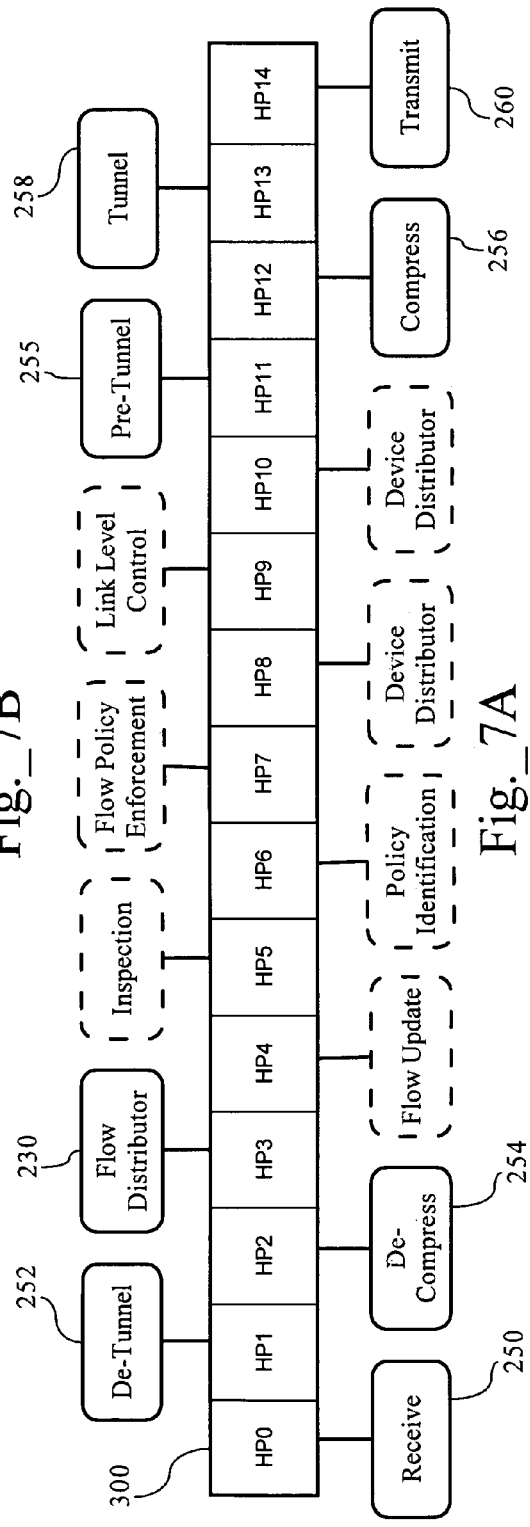

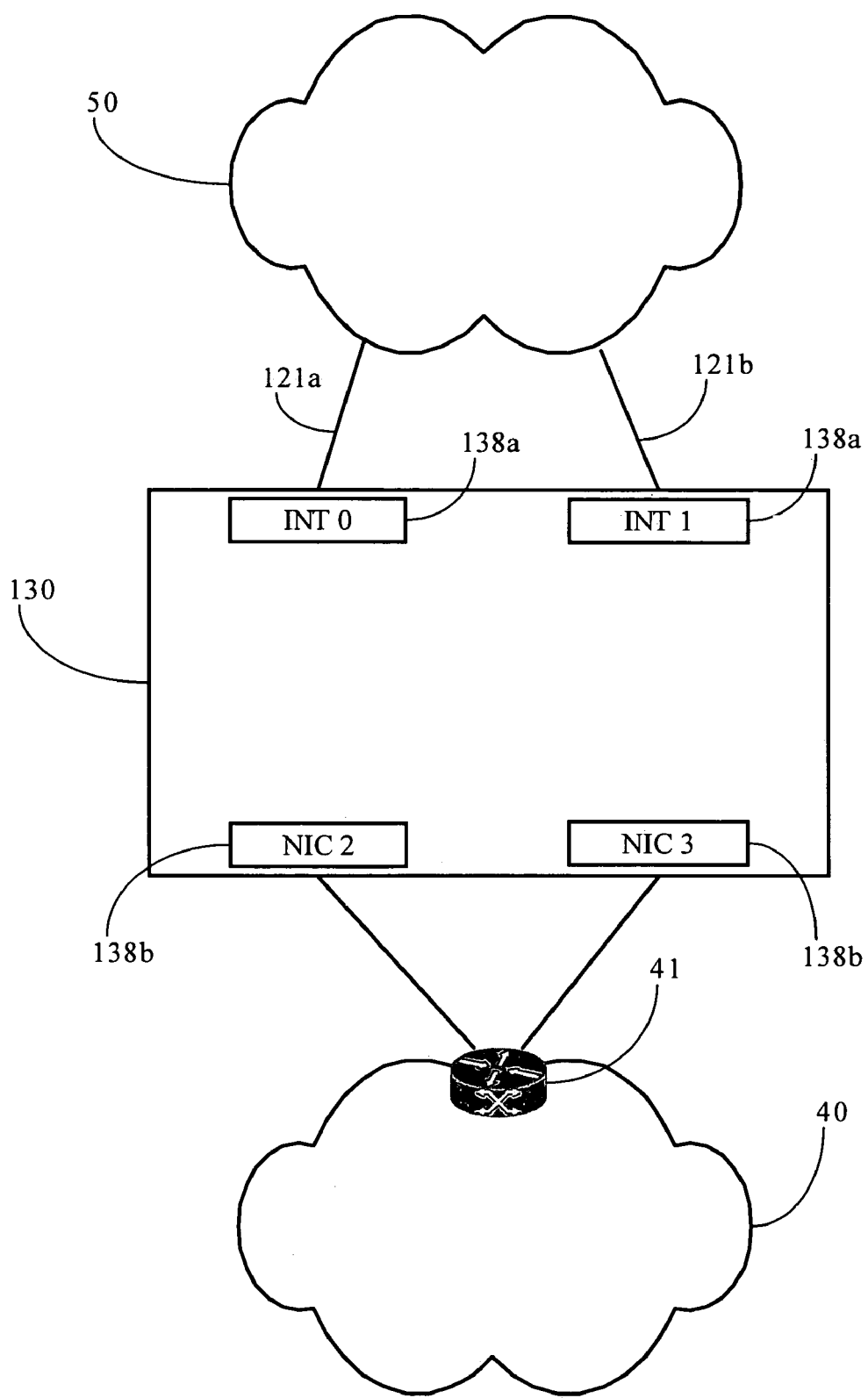
Fig._8A

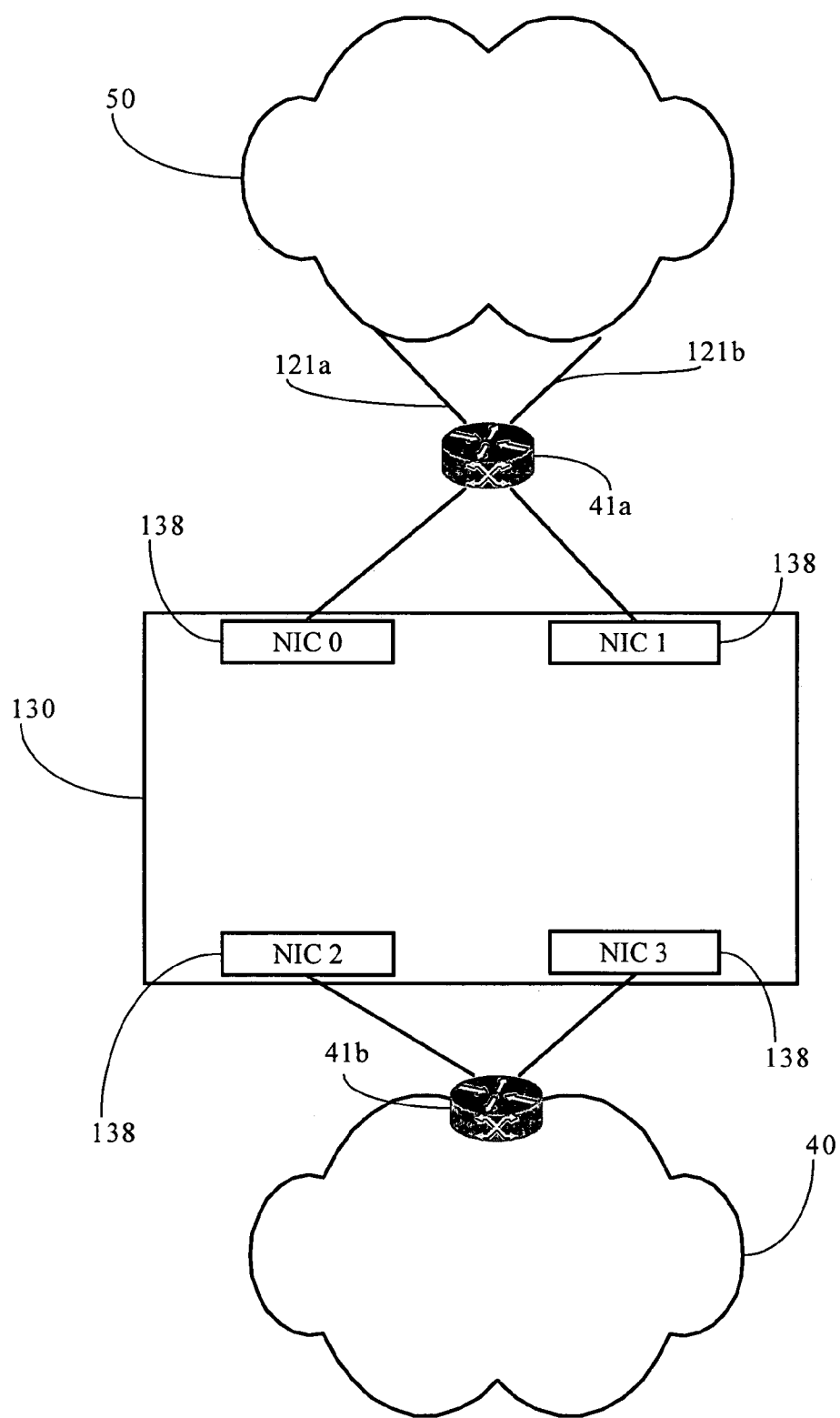
Fig._8B

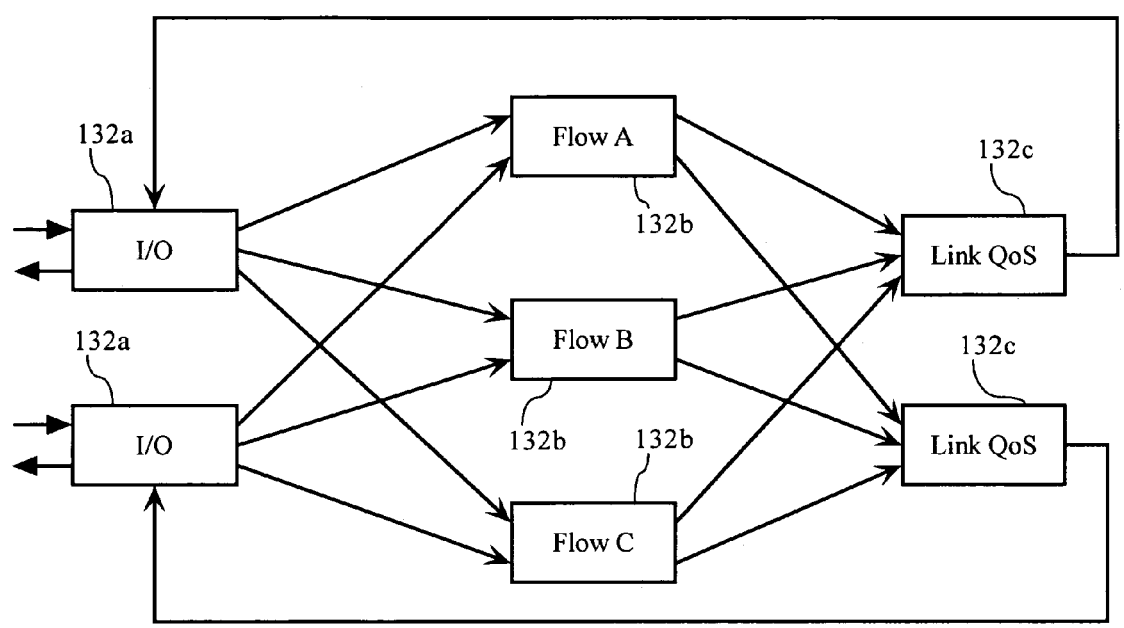
Fig._9

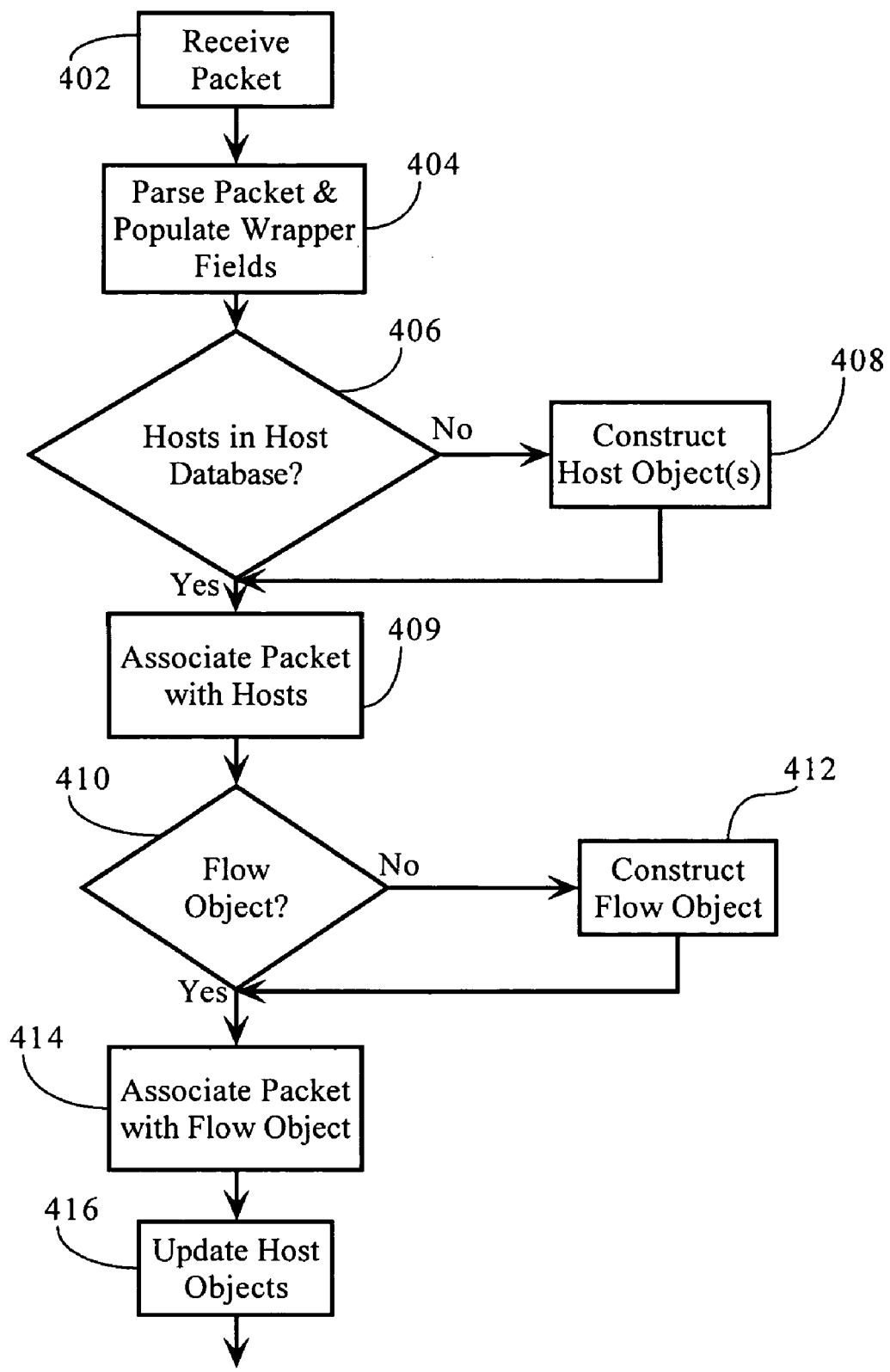
Fig._10

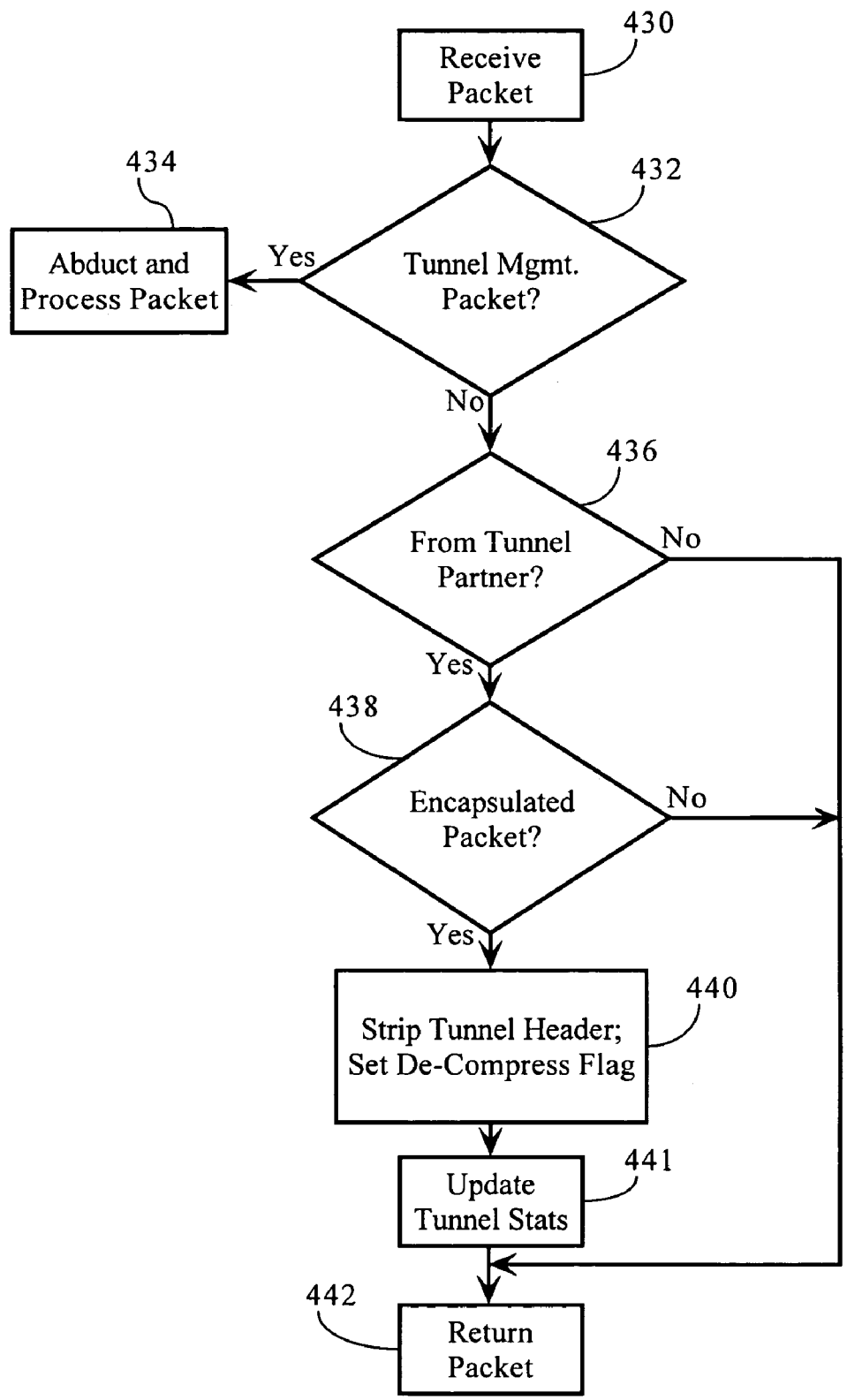
Fig._11

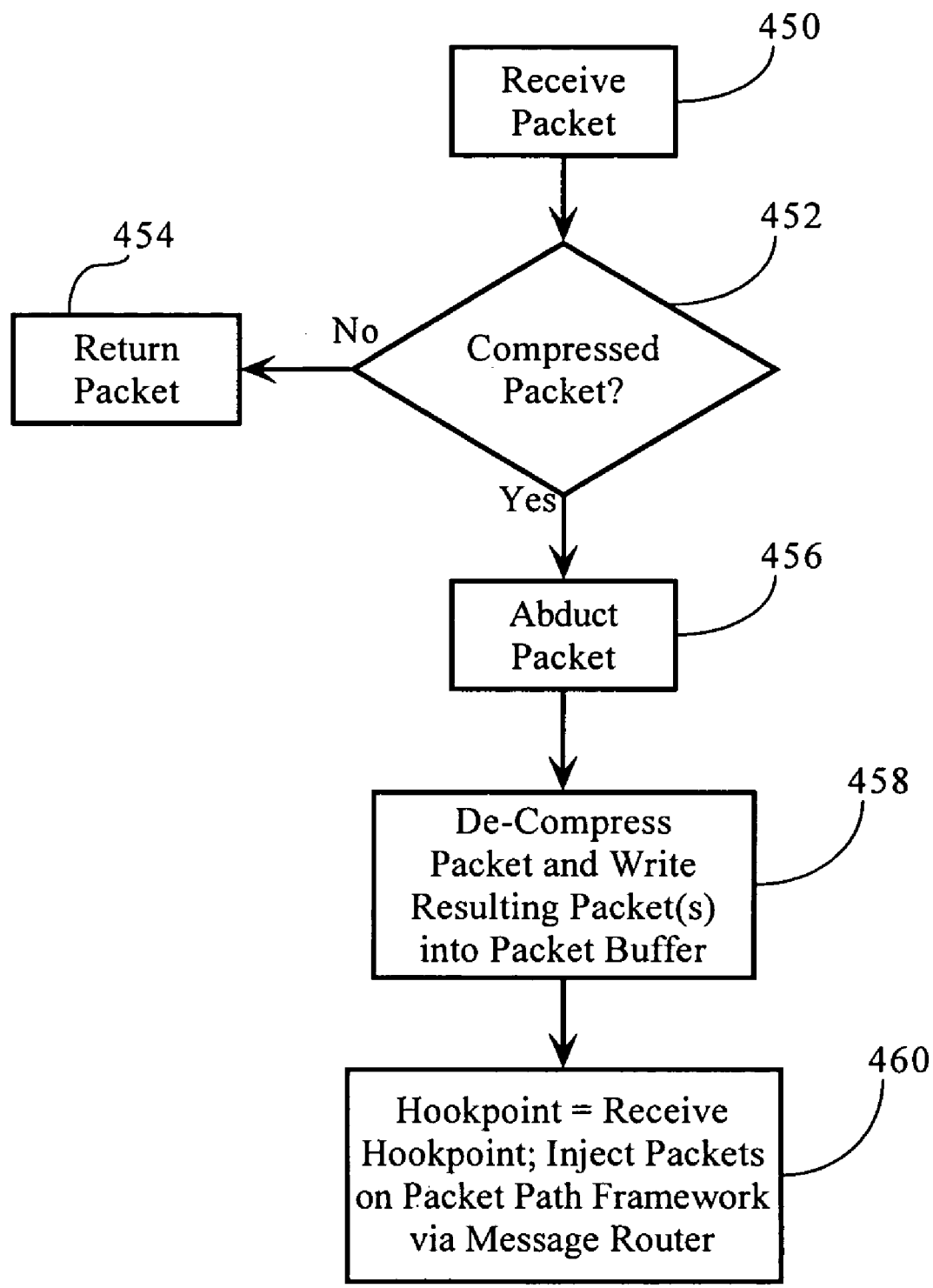
Fig._12

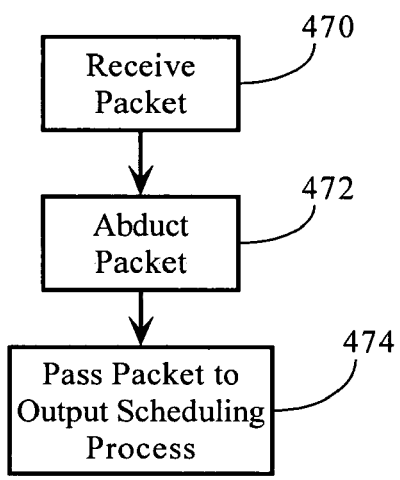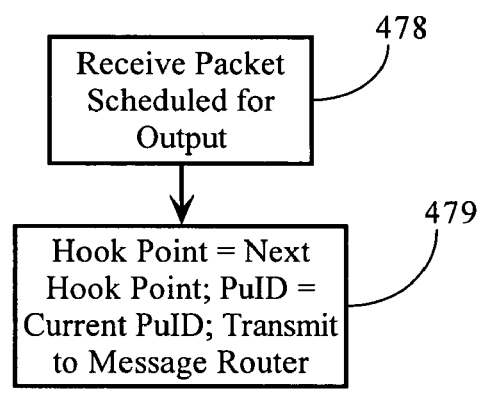
Fig._13A       Fig._13B

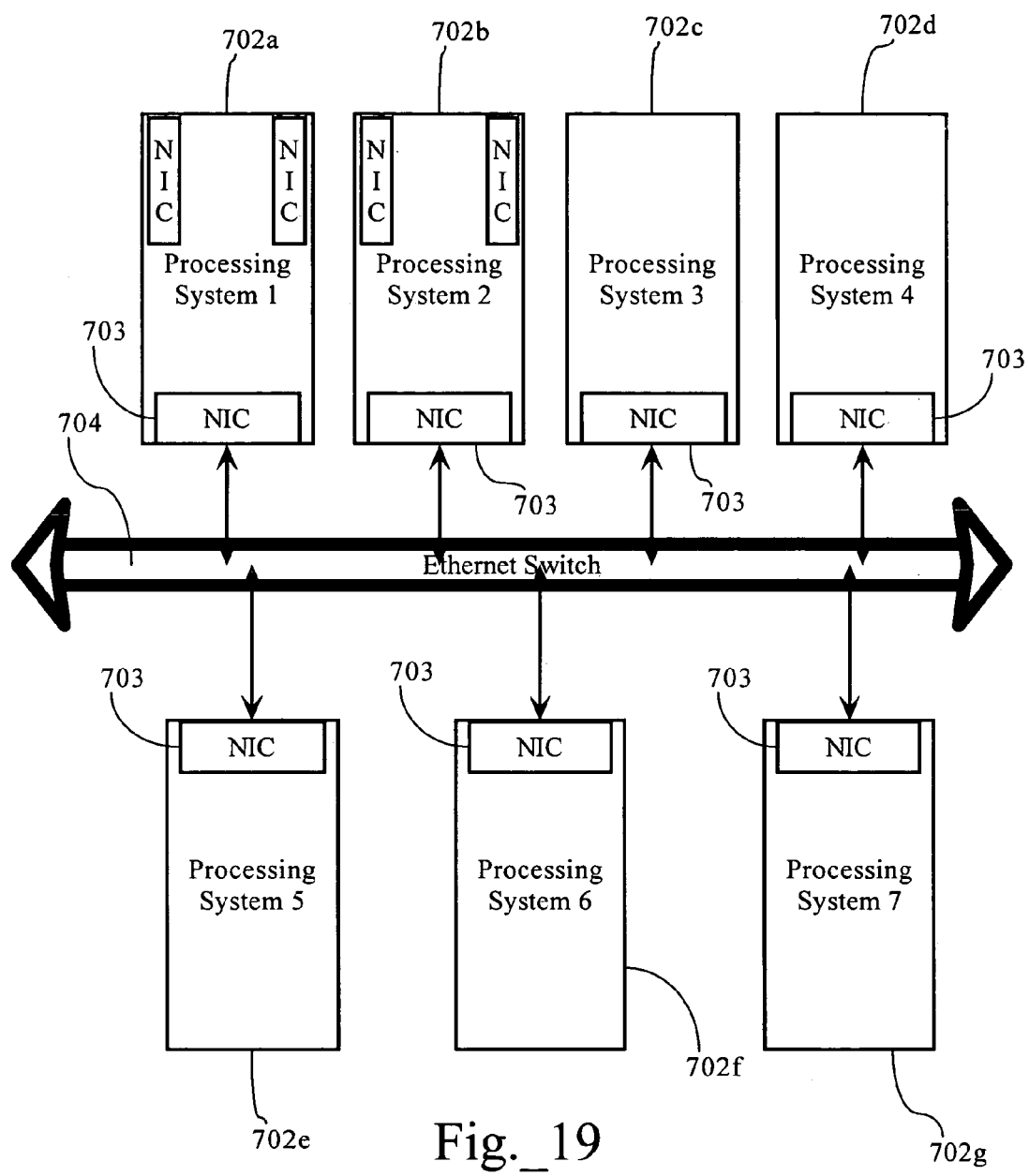
Fig._19

MULTI-DIMENSIONAL COMPUTATION DISTRIBUTION IN A PACKET PROCESSING DEVICE HAVING MULTIPLE PROCESSING ARCHITECTURE

CROSS-REFERENCE TO RELATED APPLICATIONS AND PATENTS

This application makes reference to the following commonly-owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, now U.S. Pat. No. 6,456,360, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 09/966,538, in the name of Guy Riddle, entitled "Dynamic Partitioning of Network Resources;"

U.S. patent application Ser. No. 10/015,826 in the name of Guy Riddle, entitled "Dynamic Tunnel Probing in a Communications Network;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 11/053,596 in the name of Azeem Feroz, Wei-Lung Lai, Roopesh R. Varier, James J. Stabile, and Jon Eric Okholm, entitled "Aggregate Network Resource Utilization Control Scheme;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/178,617, in the name of Robert E. Purvy, entitled "Methods, Apparatuses and Systems Facilitating Analysis of Network Device Performance;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/334,467, in the name of Mark Hill, entitled "Methods, Apparatuses and Systems Facilitating Analysis of the Performance of Network Traffic Classification Configurations;"

U.S. patent application Ser. No. 10/453,345, in the name of Scott Hankins, Michael R. Morford, and Michael J. Quinn, entitled "Flow-Based Packet Capture;"

U.S. patent application Ser. No. 10/676,383 in the name of Guy Riddle, entitled "Enhanced Flow Data Records Including Traffic Type Data;"

U.S. patent application Ser. No. 10/720,329, in the name of Weng-Chin Yung, Mark Hill and Anne Cesa Klein, entitled "Heuristic Behavior Pattern Matching of Data Flows in Enhanced Network Traffic Classification;"

U.S. patent application Ser. No. 10/812,198 in the name of Michael Robert Morford and Robert E. Purvy, entitled "Adaptive, Application-Aware Selection of Differentiated Network Services;"

U.S. patent application Ser. No. 10/843,185 in the name of Guy Riddle, Curtis Vance Bradford and Maddie Cheng, entitled "Packet Load Shedding;"

U.S. patent application Ser. No. 10/917,952 in the name of Weng-Chin Yung, entitled "Examination of Connection Handshake to Enhance Classification of Encrypted Network Traffic;"

U.S. patent application Ser. No. 10/938,435 in the name of Guy Riddle, entitled "Classification and Management of Network Traffic Based on Attributes Orthogonal to Explicit Packet Attributes;"

U.S. patent application Ser. No. 11/019,501 in the name of Suresh Muppala, entitled "Probing Hosts Against Network Application Profiles to Facilitate Classification of Network Traffic;"

U.S. patent application Ser. No. 11/027,744 in the name of Mark Urban, entitled "Adaptive Correlation of Service Level Agreement and Network Application Performance;" and U.S. patent application Ser. No. 11/241,007 in the name of Guy Riddle, entitled "Partition Configuration and Creation Mechanisms for Network Traffic Management Devices."

FIELD OF THE INVENTION

The present invention relates to computer networks and, more particularly, to methods, apparatuses and systems directed to flow-aware, multi-dimensional task distribution in network devices having multiple processor architectures.

BACKGROUND

Enterprises have become increasingly dependent on computer network infrastructures to provide services and accomplish mission-critical tasks. Indeed, the performance, security, and efficiency of these network infrastructures have become critical as enterprises increase their reliance on distributed computing environments and wide area computer networks. To that end, a variety of network devices have been created to provide data gathering, reporting, and/or operational functions, such as firewalls, gateways, packet capture devices, bandwidth management devices, application traffic monitoring devices, and the like. For example, the TCP/IP protocol suite, which is widely implemented throughout the world-wide data communications network environment called the Internet and many wide and local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

In response, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth-management devices allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, network security is another concern, such as the detection of computer viruses, as well as prevention of Denial-of-Service (DoS) attacks on, or unauthorized access to, enterprise networks. Accordingly, firewalls and other network devices are deployed at the edge of such networks to filter packets and perform various operations in response to a security threat. In addition, packet capture and other network data gathering devices are often deployed at the edge of, as well as at other strategic points in, a network to allow network administrators to monitor network conditions.

Enterprise network topologies can span a vast array of designs and connection schemes depending on the enterprise's resource requirements, the number of locations or offices to connect, desired service levels, costs and the like. A given enterprise often must support multiple LAN or WAN segments that support headquarters, branch offices and other operational and office facilities. Indeed, enterprise network design topologies often include multiple, interconnected LAN and WAN segments in the enterprise's intranet, and multiple paths to extranets and the Internet. Enterprises that cannot afford the expense of private leased-lines to develop their own WANs, often employ frame relay, or other packet switched networks, together with Virtual Private Networking (VPN) technologies to connect private enterprise sites via a service provider's public network or the Internet. Some enterprises also use VPN technology to create extranets with customers, suppliers, and vendors. These network topologies often require the deployment of a variety of network devices at each remote facility. In addition, some network systems are end-to-end solutions, such as application traffic optimizers using compression tunnels, requiring network devices at each end of a communications path between, for example, a main office and a remote facility.

Many of the network devices discussed above are typically deployed at strategic locations in the network topology such that all or nearly all network traffic flows through them. For example, firewall and intrusion detection systems are typically deployed at the edges of a network domain to filter incoming and outgoing traffic. Similarly, bandwidth management systems are typically deployed between a network and an access link to allow for more direct control of access link utilization. Given that these network devices may process large amounts of network traffic (especially during peak load conditions), they must possess sufficient computing resources to provide for sufficient performance and throughput. If the network device becomes a bottleneck, latency increases and degrades network application performance. Still further, the processes and functions performed by these network devices are becoming more complex and, thus, require higher processing power than previous generation systems. Indeed, bandwidth management systems, for example, have evolved to include complex packet inspection, classification and control mechanisms.

In some previous approaches to increasing the performance of network devices, vendors have simply relied on more powerful processors, frequently turning to customized hardware solutions. This approach, however, is inherently limited to the capability of the custom hardware. Custom hardware solutions also require increased development costs and long lead times, as well as limited flexibility for correcting bugs and adapting to changing customer requirements. In addition, while some network device manufactures have turned to systems with multiple processors, they have not addressed the challenges posed by QoS and other devices that employ stateful or flow-aware inspection, classification and control mechanisms.

In light of the foregoing, a need in the art exists for methods, apparatuses and systems directed to flow-aware task distribution in network devices having multiple processor architectures. Embodiments of the present invention substantially fulfill this need.

SUMMARY OF THE INVENTION

The present invention provides methods, apparatuses and systems directed to flow-aware task distribution in network devices having multiple processor architectures. In one embodiment, the present invention can be used for high bandwidth network processing in an application and flow aware Quality of Service (QoS) network device. In some implementations, the present invention provides a task distribution architecture capable of flow state awareness and link level QoS control. As discussed below, in some implementations, the present invention can incorporate one or more processes, such as flow distributors and device distributors, that route packets for processing among different processing units on the basis flow correspondence and/or link or network path attributes. The flow and device distributors, in one implementation, allow for the separation and parallelization of packet processing functionality into flow-specific and link-specific processing units, allowing for a highly-scalable, flow-aware task distribution in a network device that processes network application traffic.

DESCRIPTION OF THE DRAWING(S)

FIG. 1 is a schematic diagram illustrating a computer network environment in which implementations of the invention may operate.

FIG. 2A is a functional block diagram showing the logical configuration of a network device, according to one implementation of the invention, comprising a plurality of processing units.

FIG. 2B is a functional block diagram illustrating the functional and logical components of a processing unit according to an implementation of the invention.

FIG. 3 is a functional block diagram showing a packet processing path, according to one implementation of the invention, across multiple processing units.

FIG. 4 is a flow chart providing a method, according to an implementation of the invention, directed to operation of a framework processor.

FIG. 5A is a flow chart showing a method directed to a flow distributor according to an implementation of the invention.

FIG. 6 is a flow chart showing a method directed to a device distributor according to an implementation of the invention.

FIGS. 7A, 7B and 7C illustrate packet path frameworks, according to one possible implementation of the invention, executed by processing units.

FIGS. 8A and 8B are schematic diagrams illustrating two possible deployment scenarios in a computer network environment in which implementations of the invention may operate.

FIG. 9 is a functional block diagram illustrating a division of processing tasks, according to one implementation of the invention, between processing units 132 configured into three processing unit types.

FIG. 10 is a flow chart providing a method directed to operation of a receive process according to one implementation of the invention.

FIG. 11 is a flow chart showing a method directed to operation of a de-tunnel process according to one implementation of the invention.

FIG. 12 is a flow chart providing a method directed to operation of a de-compression process according to one implementation of the invention.

FIGS. 13A and 13B are flow charts illustrating methods directed to operation of link level output scheduling process according to one implementation of the invention.

FIG. 19 is a functional block diagram illustrating cluster or stack hardware architecture according to an implementation of the invention.

DESCRIPTION OF PREFERRED EMBODIMENT(S)

Figure 5B:
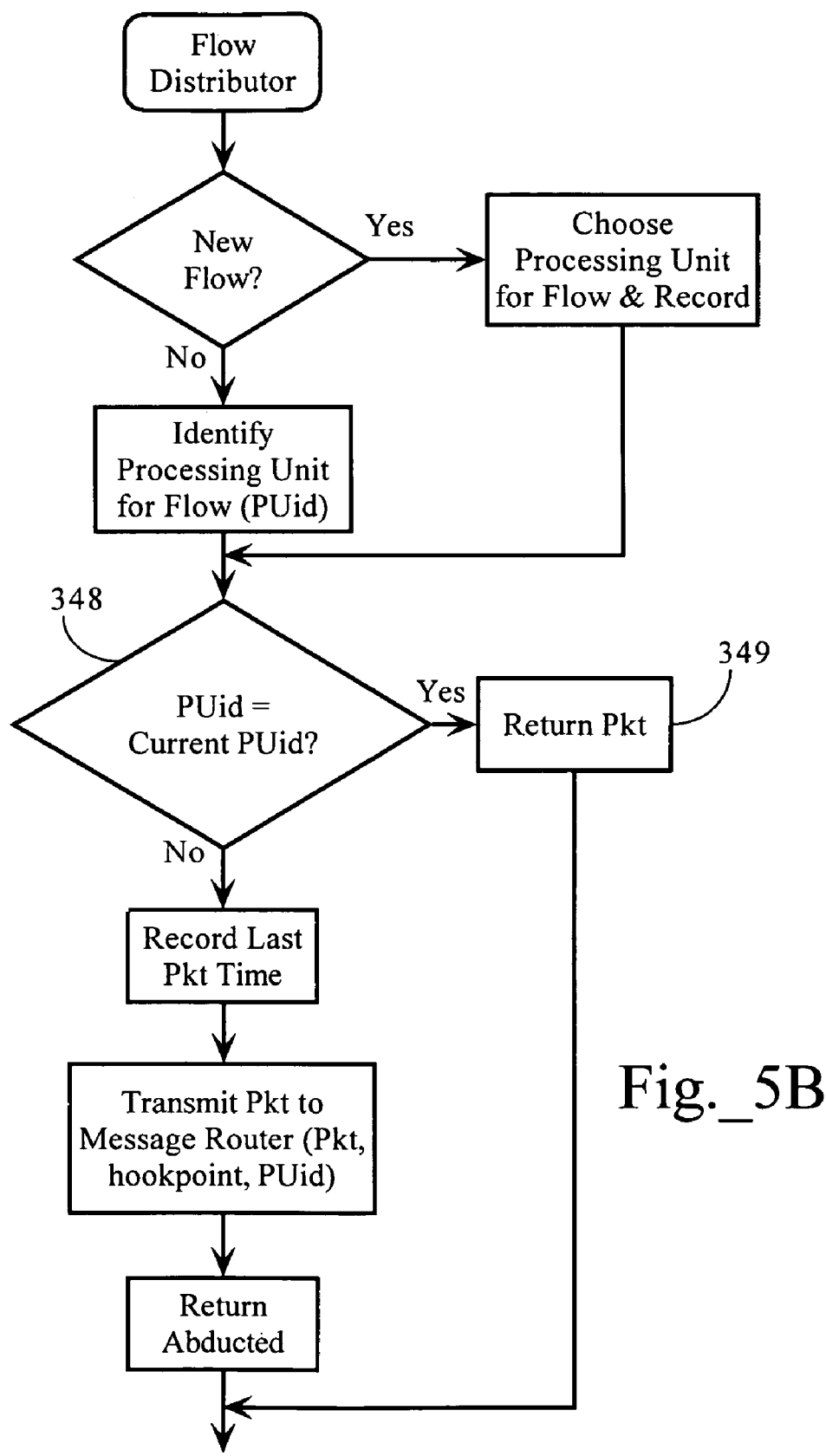
FIG. 5B is a flow chart showing an alternative method directed to a flow distributor according to an implementation of the invention.

FIG. 1 illustrates, for didactic purposes, a network 50, such as wide area network, interconnecting a first network 40, supporting a central operating or headquarters facility (for example), and a second network 40a, supporting a branch office facility (for example). Network 50 may also be operably connected to other networks, such as network 40b, associated with the same administrative domain as networks 40, 40a, or a different administrative domain. As FIG. 1 shows, the first network 40 interconnects several hosts or end systems, including client devices 42 and server device 44, and provides access to resources operably connected to computer network 50 via router 22 and access link 21. Access link 21 is a physical and/or logical connection between two networks, such as computer network 50 and network 40. The computer network environment, including network 40 and network 50 is a packet-based communications environment, employing TCP/IP protocols (for example), and/or other suitable protocols, and has a plurality of interconnected digital packet transmission stations or routing nodes. First network 40, and networks 40a & 40b, can each be a local area network, a wide area network, combinations thereof, or any other suitable network.

As FIG. 1 illustrates, network device 130, in one implementation, is deployed at the edge of network 40. FIG. 1 also shows network devices 130a, 130b deployed at the respective edges of networks 40a, 40b. In one implementation, network devices 130, 130a, 130b are network application traffic management devices operative to manage network application traffic. As discussed below, network application traffic management devices 130, 130a, 130b may include a number of different functional modules, such as compression modules, tunneling modules, rate control modules, gateway modules, protocol acceleration modules, and the like. In addition, network application traffic management devices 130, 130a, 130b may include functions, such as compression and/or tunneling, where cooperation with a remote device (such as another network application traffic management device) is required, while also performing other functions that can be performed independently. However, the flow-aware task distribution functionality according to the present invention can be integrated into a variety of network devices, such as proxies, firewalls, intrusion detection systems, packet capture or network monitoring equipment, VPN servers, web services network gateways or brokers, and the like.

FIG. 2A is a block diagram illustrating functional components of network device 130 according to one implementation of the invention. As FIG. 2A illustrates, network device 130 comprises a plurality of processing units 132 operably connected by inter-connect 134. In one implementation, at least one of the processing units 132 includes at least one network interface 138 operative to transmit and receive packets from one or more remote devices. As FIG. 2A illustrates, processing units 132 also include message routers 136 operative to allow processing units 132 to exchange messages over inter-connect 134. Inter-connect 134 generally refers to a communications medium across which messages can be sent. As discussed in more detail below, inter-connect 134 can be a server or blade backplane, a switch fabric interconnect, a system bus, an Ethernet network, and the like.

FIG. 2B is a block diagram illustrating functional and logical components of a processing unit 132 according to one possible implementation of the invention. In one implementation, a processing unit 132 comprises a framework processor 220, a packet path framework 300, message router 136, and processing queues 214 and 216. Processing unit 132 may also comprise a flow distributor 230 and one or more network interfaces 138. Message router 136, in one implementation, route messages to other message routers 136 of other processing units 132. As to received messages containing packets or pointers to packets for processing, message router 136 is operative to place the incoming message on processing queue 214. Functional block 138 generally refers to one or more network interfaces. As discussed in more detail below, incoming packets received at the one or more network interfaces are placed on processing queue 216. As discussed below, packets received at network interface 138 are read into memory. In one implementation, the entries in the processing queues 214, 216 contain pointers or addresses to the packets stored in the memory. Still further, each entry in the processing queues 214, 216 may also contain a hook point identifier corresponding to a functional processing module and, in some instances, a processing unit identifier. The memory storing the received packets may be shared across the processing units 132. In such an implementation, the messages transmitted by message routers 136 may include packet pointers or addresses, hook point identifiers and processing unit identifiers. In other implementations, where each processing unit 132 has its own dedicated physical memory space, the messages transmitted between message routers 136 may include the packet data as opposed to a pointer or address. In addition, message routers 136 may also include one or more buffer or queuing structures to store packets to be routed to processing units.

Framework processor 220, in one implementation, arbitrates between processing queues 214 and 216 to select packets for processing by one or more functional processing modules according to the order defined by the packet path framework 300. In some implementations, processing units 132 can comprise fewer or additional processing queues. For example, processing units 132 that are not configured to operate in connection with a network interface 138 may contain only processing queue 214. In other implementations, however, additional processing queues can be used to provide for a priority processing scheme. Flow distributor 230 represents one of several functional processing modules that processing unit 132 can contain. As discussed in more detail below, flow distributor 230, in one implementation, implements a flow-aware process that distributes packets on a flow-by-flow basis to processing units 132 for processing. Packet path framework 300 is an array, list or other data structure, defining the order in which various functional processing modules operate on packets. In one implementation, packet path framework 300 comprises a plurality of hook points, each corresponding to a functional processing module (such as a flow distributor).

FIG. 3 illustrates a packet processing path between processing units 132*a*, 132*b*, 132*c* according to one possible implementation of the invention. The numbered blocks 1 thru 7 represent functional processing modules (discussed in more detail below). The circled reference numbers 1-11, in connection with the directional lines, illustrate a possible processing path taken by a given packet. FIG. 3 shows how an incoming packet (See Ref. No. 1) may be processed by a first functional processing module 1. As FIG. 3 illustrates, further processing of the packet may then be transferred to processing unit 132*b* via message routers 136*a*, 136*b* (Ref. Nos. 2, 3, 4). Functional processing modules 2 and 3 may operate on the packet, while module 4 may cause further processing of the packet to be transferred to processing unit 132*c* (Ref. Nos. 5, 6, 7), where functional processing modules 4 thru 6 operate on the packet. Lastly, module 7 of processing in one implementation, may transfer processing of the packet back to processing unit 132*a* (Ref. No. 8, 9, 10), where functional processing module 7 processes the packet and causes it to be transmitted from the network device (Ref. No. 11). Other implementations are possible. For example, one or more of the functional processing modules implemented on the packet path framework 300 of a first processing unit 132*a* can be stubs which simply abduct packets and transfer them to a corresponding functional processing module located on a different processing unit 132*b*. Operation of the various components of processing units 132*a*, 132*b*, 132*c* are described in more detail below.

FIG. 4 provides a method, according to one possible implementation of the invention, executed by a framework processor 220 of a processing unit 132. Framework processor 220 is operative to process packets on processing queue 214 through the ordered set of functional processing modules defined by the packet path framework 300. In addition, for processing units 132 that include one or more network interfaces 138, framework processor 220 is operative to arbitrate between processing queue 214 and 216. In some implementations, processing unit 132 may include a single processing queue 216 for all network interfaces, or respective processing queues 216 for each network interface. The arbitration scheme can be a round-robin scheme, a weighted round-robin scheme or some other algorithm. In some implementations, the arbitration scheme may be biased in favor of selecting packets on processing queue 214. As FIG. 4 illustrates, if the processing queue 214 and/or 216 contains a packet (302), framework processor 220 pops the packet off the corresponding processing queue 214, 216 and invokes the functional processing module, passing the packet or packet pointer, corresponding to the hook point identifier associated with the packet (304). In one implementation, a functional processing module may respond in two generalized ways. A functional processing module may perform one or more operations in response to the invocation and return the packet or packet pointer to the framework processor 220. Alternatively, the functional processing module may perform one or more operations and return an "abducted" message or signal to the framework processor 220. If the functional processing module abducts the packet (306), framework processor 220 pops the next packet off a selected one of the processing queues 214, 216. Otherwise, framework processor 220 identifies the next hook point in the packet path framework 300 and invokes the corresponding functional processing module. Generally speaking, the last functional processing module (such as a transmit module, below) in the packet path frame 300 abducts the packet.

Message routers 136 can employ any suitable process and protocols for routing messages between processing units 132. In one implementation, a processing unit 132, typically during initialization or start-up, registers with its local message router 136. In one implementation, the message routers 136 employ a publish-subscribe message distribution model. In one implementation, a management or start-up module of the processing unit 132 registers with its local message router 136 as a subscriber to subject or topic. In one implementation, the subject or topic name is a processing unit identifier. The message routers 136, in one implementation, are operative to implement a process or protocol operative to synchronize or update a global, distributed subscription list. The local message router 136 can notify remote message routers 136 of other processing units 132 of the subject or topic. The notification can be a broadcast message, a multicast message, or a series of unicast messages. A remote element, such as another processing unit 132, can transmit messages to a desired processing unit 132 by publishing a message to a subject or topic corresponding to the destination processing unit 132. The message routers 136 may be configured to automatically discover one another using discovery mechanisms, such as Layer 2 or Layer 3 discovery mechanisms, appropriate to the interconnection or backplane between the processing units 132. In another implementation, the message routers 136 can be pre-configured with knowledge of each other by for example accessing a configuration file with a list of the address or other identifier for all message routers. Of course, the message routers 136 can be configured to implement other suitable processes and protocols for transmitting messages between processing units 136.

A. Packet Path Framework & Functional Processing Modules

Figure 7C:
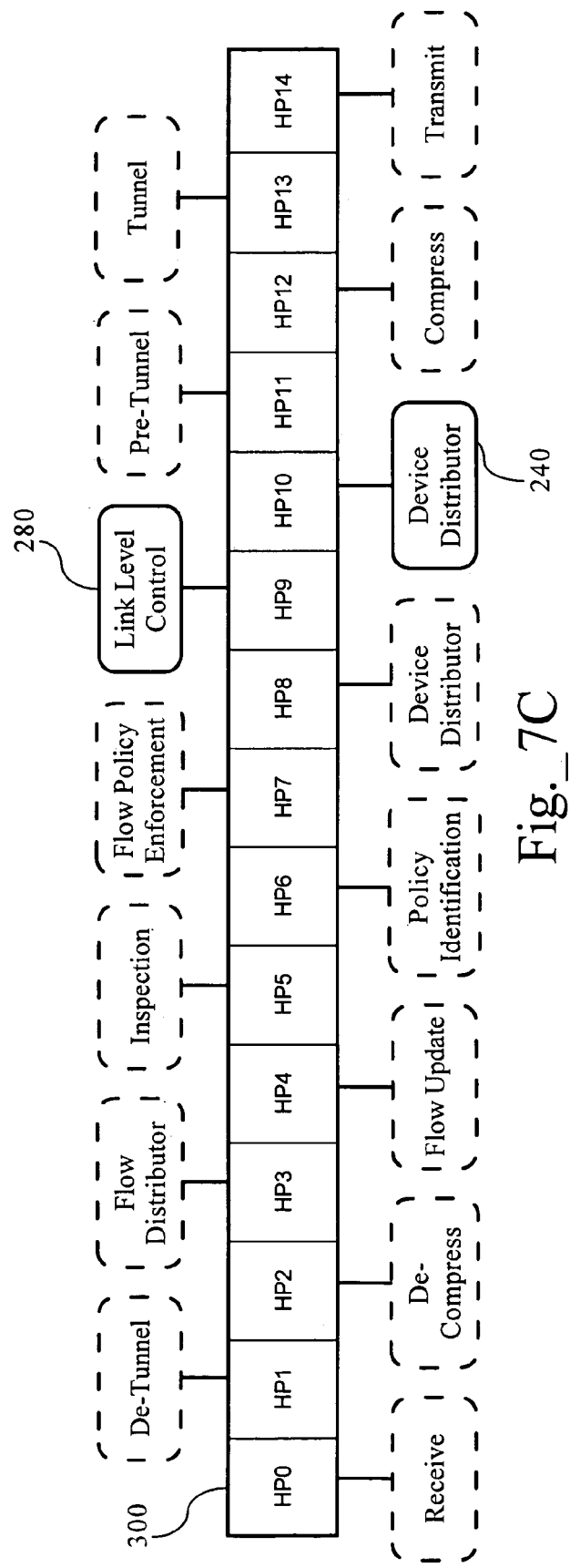

FIGS. 7A, 7B and 7C illustrate packet path frameworks 300, according to a possible implementation of the invention, corresponding to different processing units 132. Packet path frameworks 300 are an array, list or other data structure that defines the order in which a set of functional processing modules operate on packets. In one implementation, a packet path framework 300 is an array of hook points (HP0, HP1, etc.) each identifying a functional processing module. Functional processing modules, such as flow distributor 230 and device distributor 240 are shown in blocks. Flow distributor 230 routes packets for processing among different processing units on the basis flow correspondence, while device distributor 240 routes packets among processing units on the basis of link or network path attributes. In these figures, blocks with continuous borders indicate that the corresponding functional module is executed locally at a given processing unit 132, while dashed borders indicate that the functional processing module is executed at a remote processing unit 132. For example, a processing unit 132 implementing the packet path framework 300 of FIG. 7A may be configured to execute a receive process 250, a de-tunnel process 252, a de-compression process 254 and a flow distributor process 240, which may transfer packet processing to another processing unit implementing the packet path framework 300 of FIG. 7B. In addition, FIG. 7B illustrates functional processing modules that operate on a per-flow basis (for example, an inspection module or process may inspect a plurality of packets in a flow to identify a network application type). As FIG. 7B illustrates, the functional processing modules may include a flow update module 270, an inspection module 272, a policy identification module 274, a flow policy enforcement module 276, and a device distributor 240. Lastly, FIG. 7C illustrates a packet path framework 300 whose active functional processing modules are directed to link level operations, such as a link level control module 280, which in one implementation is operative to apply aggregate utilization controls on data flows traversing a communications link. A device distributor 240 may cause packets to be transferred back to a processing unit 132 that includes a compression module 256, a tunnel module 258 and a transmit module (see FIG. 7A).

The functional breakdown illustrated in FIGS. 7A, 7B and 7C represents one of many possible implementations. As one skilled in the art will recognize, some of the modules described above may be combined with other modules, while the operations of some other modules may be further broken down into more modules. Furthermore, additional modules directed to other functions (such as intrusion detection, packet capture, etc.) can also be added, or can replace, existing modules. Still further, a given functional processing module can be registered on the packet path framework 300 in more than one entry. For example, compression module 256 and de-compression module 254 can be combined into a single module (or as sub-modules of a larger module) registered at two locations in the packet path framework 300, thereby obviating the need to transfer state information between separate modules. In addition, de-tunnel 252 and/or pre-tunnel module 255 and tunnel module 258 can all be combined as well.

Certain functional processing modules, as discussed above, are operative to transfer processing of packets to other processing units 132. For example, flow distributor 230 is operative to make flow-based decisions such that packets corresponding to the same data flow are routed to the same processing unit 132 for processing. Device distributors 240 are functional processing modules that make link or network path related decisions to ensure that packets and flows corresponding to the same network path segment or link are processed by a processing unit associated with the corresponding link or network path. In addition, redirector modules are operative to transfer packets for off-line processing by functional modules not implicated in the packet path framework. Still further, some functional processing modules, as discussed below, are operative to process packets and re-inject them at the beginning or other points in the packet path framework 300.

FIG. 9 is a functional block diagram illustrating the division of processing tasks, according to one implementation of the invention, between processing units 132 configured into three processing unit types. For example, in one implementation, one or more processing units 132*a* can be configured into input/output (I/O) processing units by configuring them to execute tasks associated with receiving and transmitting packets. In addition, one or more processing units 132*b* can be configured to implement one or more operations that are directed to flow aware processes, while one or more processing units 132*c* can be configured to implement one or more operations directed to link-level control or processing. As FIG. 9 illustrates, incoming packets at I/O processing units 132*a* are routed to flow processing units 132*b*. The packets are then routed to link QoS processing units 132*c*, and then on to I/O processing units 132*a* for transmission along respective network paths. Section B, below, describes how the processing units 132 can be implemented on various computer hardware architectures.

A.1. Receive Process; Flow and Host Databases

The receive module 250, generally speaking, performs initial operations on received packets. Packets received at network interface 138 are read in packet buffer space—a memory space, typically in dynamic random access memory (DRAM), reserved for packets traversing network device 130. In one implementation, a Direct Memory Access Controller facilitates reading of received packets into memory without substantial involvement of hardware central processing resources. U.S. application Ser. No. 10/843,185 provides a description of the operation of various modules (according to one possible implementation of the claimed embodiments), such as network interface drivers, and data structures for receiving into memory and processing packets encountered at network interfaces 138. In one embodiment, the packets are stored in the packet buffer with a wrapper including various fields reserved for packet attributes (such as source address, destination address, protocol identifiers, port identifiers, TCP headers, VLAN tags, MPLS tags, diffserv markings, etc.), meta data (such as the time the packet was received, the packet flow direction (inbound or outbound)), and one or more pointers to data structures or objects (e.g., a flow object corresponding to the flow of which the packet is a part). After a packet is read into buffer memory, a pointer to the packet and, optionally, a hook point identifier is placed on processing queue 216. In one implementation, the framework processor 220 pops packets off the queue 216 and invokes the receive module 250. As part of the receive operations, receive module 250 parses packets passed to it and populates one or more fields of the wrapper. Receive module 250 may also set flags in the packet wrapper that signals other modules in the packet path framework to operate on the packets or ignore them.

Other receive operations may include identification of hosts and storing host information in a host database, as well as association of packets with data flows and hosts. As FIG. 10 illustrates, when receive module 250 receives a packet (402), it parses the packet, recording packet attributes and metadata relating to the packet in the fields of the wrapper in the packet buffer (404). Receive module 250 then determines whether the hosts identified in the packet (source and destination addresses) are contained in the host database (406). If not, receive module 250 constructs the host objects in the host database as required (408).

Receive module 250 then determines whether a flow object has already been created for the flow to which the data packet is a part (404). A flow object is a data structure including fields whose values characterize various attributes of the flow, including source and destination IP addresses, port numbers, traffic type identifiers and the like. A flow object can also include other attributes, such as packet count, byte count, first packet time, last packet time, etc. If a flow object is not found, packet processor 82 constructs a new flow object (412). In one embodiment, each flow object includes an indicator of which host is the server, and which is the client, in the transaction. In TCP flows (for example), the client is the host transmitting the SYN packet to initiate the TCP handshake, while the server transmits the SYN/ACK packet. Of course, other methods of determining the server and client can depend on the transport layer protocol, and/or include inspecting information from other layers in the packet. As FIG. 10 shows, receive module 250 then associates the packet with the flow object, in one implementation, by writing a pointer to the flow object in a reserved packet wrapper field (414).

Receive module 250, in one implementation, also updates one or more attributes of the corresponding host objects. The host database, in one implementation, maintains one or more data flow or other metrics in association with the hosts. In one implementation, the host database, maintains, inter alia, for each IP address 1) the number of concurrent connections (Conn); 2) the current data flow rate (Curr rate); and 3) the average bits per second (bps) over a one-minute interval (1 Min avg). In addition, in one implementation, host database 134 maintains for each host address the following fields: 4) the number of new flows or connections for which the host is a client over the last minute; 5) the number of new flows or connections for which the host is a server over the last minute; and 6) the number of failed flows corresponding to a given host. In some implementations, host database 134 may also be configured to maintain: 7) the number of current or existing TCP (or other handshake-oriented protocol) connections for which the host is a client; 8) the number of current UDP (or other similar protocol) connections for which the host is a client; 9) the number of current or existing TCP (or other handshake-oriented protocol) connections for which the host is a server; and 10) the number of current UDP (or other similar protocol) connections for which the host is a server. Receive module 250 is operative to identify new data flows, as well as the termination of existing data flows, and updates the statistics identified above as data flows traverse network device. Other functional processing modules may access these values, as well as other data structures (e.g., flow database 135) to perform one or more operations on packets and/or data flows. Other implementations are possible. For example, receive module 250 can be configured such that host object creation is incorporated into the processes associated with flow object creation, such that the flow object determinations are made prior to the host object checks and creation processes.

Data flows are identified based on a set of attributes (attribute tuple). The set of attributes may include one or more of the following source and destination IP addresses, port numbers, protocol identifiers, traffic type identifiers and the like. In one implementation, data flows are identified based on a tuple of source IP address, destination IP address, source port number, destination port number, and a protocol identifier (derived from the "protocol" field in IPv4 headers, and the "NextHeader" field in IPv6 headers). In other implementations, the IP addresses of the hosts corresponding to data flows can be identified as client and server IP addresses as opposed to source and destination addresses. One skilled in the art will recognize that data flows can be identified in relation to a variety of attributes and combinations of attributes (for example, some transport layer protocols support explicit flow identifiers). Still further, for non-IP flows, data flows can be identified relative to Media Access Control (MAC) addresses or frame relay Private Virtual Circuit (PVC) identifies, phone numbers, and the like. In one embodiment, to facilitate association of an existing entry in the flow database to subsequent packets associated with a data flow or connection, the flow database is configured as a hash table (or other suitable data structure), where the key comprises a hashed value computed from a string comprising the attribute tuple discussed herein. According to this embodiment, to identify whether a flow object entry exists for a given data flow, receive module 250 hashes the values identified above and scans the flow database for a matching entry.

In one embodiment, data flows generally involve connection-oriented protocols (e.g., Transport Control Protocol (TCP)) or connection-less protocols (e.g., User Datagram Protocol (UDP)). However, any suitable transport layer flow can be recognized and detected. In addition, methods for determining new data flows and assigning packets to existing data flows are well known in the art and also depend on the particular transport layer protocol employed. For a TCP flow, receive module 250 can determine a new data flow by detecting SYN and/or SYN/ACK packets. However, a new data flow can simply be a data flow for which there is no corresponding entry in the flow database. For example, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new tuple combination, the attributes discussed above are stored in a flow object or other data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another implementation, a background and/or separate process can periodically compare the last packet times associated with a flow to a threshold period of time and erase the entry, if the last packet time is beyond the threshold period of time. In one implementation, receive module 250 can implement a least recently used (LRU) algorithm to reclaim space in the flow state data structure for new data flows. A variety of other data flow types can be identified. For non-IP traffic, such as AppleTalk, flows can be identified based on attribute tuples that include on or more of the source MAC address, destination MAC address.

While the host and flow databases described above are implemented as central entities accessed by various functional processing modules, other implementations are possible. For example, host database and/or flow database, as a central entity, can be eliminated. Alternatively, some of the information that would have been stored in the host or flow database can be stored in a distributed fashion in a manner accessible to the functional processing module that needs a given information element. In such an implementation, each functional processing module can store host and/or flow attribute or other information relevant to it in a data store in association with an identifier (e.g., IP address, MAC address, port numbers, and/or a combination of elements). In one implementation, the elements of the identifier can be hashed to facilitate fast searching and retrieval of desired information in the data store. For example, in one implementation, if a functional processing module requires certain flow state information be stored, it can hash one or more elements of an identifier and request that the flow state information be stored in association with the hashed identifier. Thereafter, the functional processing module can access the data and update the corresponding entry as required.

In one implementation, the receive module 250 may also include functionality directed to compensating for IP fragmentation (where a packet transmitted from a host is broken into two or more smaller packets at some point in the communications path to the destination host). In one implementation, the receive module 250 abducts and buffers fragmented packets, if it senses that fragments are delivered out of order. When the missing packet(s) are received, the receive module 250 re-injects them in the appropriate order into the packet processing path via message router 136.

A.2. De-Tunnel and De-Compression Modules

De-tunnel module 252 is operative to strip encapsulating headers from packets received from one or more remote tunnel partners. De-tunnel module 252 may also process tunnel management messages transmitted by remote tunnel partners as required to discover, establish and/or maintain active tunnels. FIG. 11 shows a method, according to one implementation of the invention, directed to the operation of de-tunnel module 252. In one implementation, when de-tunnel module 252 receives a packet (430), it determines whether it is a tunnel management packet (432). Tunnel management packets may include probe response packets for example. U.S. application Ser. Nos. 10/015,826 and 11/082,638, incorporated by reference above, disclose discovery and implementation of tunnels for compression and other operations. If the packet is a tunnel management packet, de-tunnel module 252 abducts and processes the packet. Otherwise, the de-tunnel module 252 determines whether the packet was received from a tunnel partner (436) and whether the packet includes an encapsulating header (438). If both conditions are met, de-tunnel module 252 strips the encapsulating header (and, in one implementation, sets a de-compress flag in the packet wrapper) (440), updates one or more tunnel statistics (e.g. packet count, byte count, etc.) (441), and returns the packet to the framework processor 220. In other implementations, the de-tunnel module 252 may abduct packets and re-inject de-capsulated packets onto the packet path framework 300 for processing by receive module 250 or other designated modules.

De-compression module 254 is operative to de-compress received packets that have been compressed by a remote node. Section A.9., below, describes various compression algorithms and processes that can be incorporated into implementations of the invention. U.S. application Ser. Nos. 10/015,826 and 11/082,638 disclose various operations related to compression and de-compression of network data. As FIG. 12 shows, in one implementation, de-compression module 254, upon receipt of a packet (450), determines whether the packet is a compressed packet (452). In one implementation, de-compression module 254 operates on packets where the de-compress flag has been set in the packet wrapper (see above). Other methods of determining whether a packet contains compressed data can also be used. If the packet does not include compressed data, de-compression module 254 returns the packet to framework processor 220. In the opposite case, de-compression module 254 abducts the packet (456). De-compression module 254 then de-compresses the packet, writing the resulting packet(s) into the packet buffer (458). De-compression module 254 then places the resulting packet(s) onto processing queue 214 (in one implementation, via message router 136), setting the hook point to the receive module 250, where the resulting packets are eventually re-injected onto the packet path framework 300 (460). The framework processor 220 will eventually pop the packets from processing queue 214 and pass them to receive module 250, which performs one or more operations discussed above. However, since the resulting packets do not include encapsulating headers and are not compressed, the de-tunnel and de-compression modules 252 and 254 wilt not operate on them. According to the packet path framework 300 illustrated in FIG. 7A, a flow distributor 230 may operate to distribute processing of packets to other processing units on a flow-aware basis, as described below.

A.3. Flow Distributor

FIG. 5A illustrates the operation of a flow distributor 230 according to one implementation of the invention. When framework processor 220 passes a packet to flow distributor 230 (318), it first determines whether the packet corresponds to a new data flow (320). In one implementation, flow distributor 230 maintains a flow state table or other data structure to track data flows and the processing units 132 assigned to the data flows. In another implementation, flow distributor 230 uses information computed by the receive module 250 to identify new data flows. For example, receive module 250, upon detection of a new data flow, may set a "new flow" bit or flag in the packet wrapper or flow object. In addition, the processing units assigned to a given data flow can be recorded in the corresponding flow object. Flow distributor 230, in one implementation, identifies data flows based on an attribute tuple. If the packet corresponds to a new data flow, flow distributor 230 chooses a processing unit 132 for processing of packets for the data flow and records the information in the flow state table (322). If the packet is part of an existing flow, flow distributor 230 identifies the processing unit 132 assigned to the data flow (324). Flow distributor 230 then records the last packet time in the flow state data structure (325), and passes the packet (or packet pointer), a hook point identifier, and a processing unit identifier (PUid) to the message router 136. Flow distributor 230 also returns an abducted signal or message to the framework processor 220 (328), causing it to start processing of another packet in one of the processing queues 214, 216.

Several different algorithms or processes can be employed to choose a processing unit 132 for new data flows. Some distribution schemes can involve a deterministic algorithm wherein each processing unit 132 is assigned a given range of values corresponding to one or more selected elements of the flow attribute tuple. For example, the last octet of the client IP address and the last octet of the server IP address can be added together. The least significant byte of the resulting sum can be indexed into a table of processing unit identifiers. Of course, the distribution algorithm described above represents one or myriad possible distribution algorithms. Other distribution algorithms can incorporate round-robin schemes. The distribution algorithms can incorporate weighting schemes based on observed or predicted load at each processing unit 132. In yet other embodiments, flow distributor 230 can also base distribution decisions for a given flow based on past decisions involving other flows to which the given flow may be associated. For example, if network device 130 has encountered an FTP command flow, and a processing unit 132 has been assigned to it, the flow distributor 230, in one implementation, can be configured to assign the corresponding FTP data flow to the same processing unit 132. In one implementation, the inspection module 272 can be configured, when it encounters a first data flow (e.g., FTP command flow, SIP signaling session, etc.) that is likely to have one or more associated data flows (e.g., FTP data flow, RTP flows for VoIP call, etc.), to signal one or more flow distributors to pass the one or more associated flows to it. In one implementation, inspection module 272 can generate a message, which identifies the flow distributor(s) 230, that gets routed via message routers 136 and processing queues 214 to the flow distributor(s) 230.

FIG. 5B illustrates an alternative method for flow distributor 230. In some implementations, flow distributor 230 may choose the same processing unit 132 that is executing the instance of the flow distributor. In the implementation described above, the message router 136 would transfer the packet to processing queue 214 on the processing unit 132 where it would eventually be selected by framework processor 220. As FIG. 5B shows, after selection or identification of a processing unit 132, flow distributor 230 determines whether the selected or identified processing unit is the current processing unit (348). If so, flow distributor 230 returns (as opposed to abducting) the packet to the framework processor 220, which invokes the next functional processing module in the packet path framework 300.

As discussed above, flow state information is maintained to allow for packets corresponding to individual data flows to be routed to selected processing units 132 for processing. Flow distributor 230 may maintain a flow state table, as discussed above, to maintain this information. In another implementations, the processing unit identifiers can be maintained in a reserved packet wrapper field and/or a reserved field of the corresponding flow object.

A.4. Flow Update Module

Flow update module 270 is operative to update one or more statistics, metrics and/or variables maintained by the flow objects associated with various data flows. Flow update module 270, in one implementation, receives a packet from framework processor 220, identifies the flow object corresponding to the packet (by inspecting the pointer in the packet buffer or hashing the attribute tuple values to find a matching flow object), updates one or more attributes of the flow object, and returns the packet to framework processor 220. Flow object attributes can include one or more of the following: packet count, last packet time, byte count, protocol parameters (e.g., advertised window size, sequence numbers, etc.) and connection status. In some implementations, the metrics can be maintained on a half-connection basis (server-to-client & client-to-server) and/or an aggregate basis.

A.5. Inspection Module

Inspection module 272 is operative to identify one or more network applications corresponding to data flows. Network application type identification, in one implementation, can be a preliminary operation to the identification of one or more policies or other processing to be applied to the data flow (see Policy Identification Module, below). In one implementation, inspection module 272 analyzes packets in data flows, and applies matching rules corresponding to a plurality of network applications. Generally speaking, inspection module 272 returns packets to framework processor 220 after processing them. While inspection module may use any suitable means for identifying matching network application types, the following illustrates one possible implementation.

Inspection module 272, in one implementation, comprises a plurality of network application type identification modules, each of which correspond to a set of network application types. Each network application type identification module analyzes one or more packets in a given data flow to attempt to identify a network application type corresponding to the flow. A network application type, in one implementation, can be a network protocol, a service, or a network-application. For example, one network application type identification module can correspond to a network application, such as Citrix®, while another network application type identification module can be dedicated to detecting Oracle® or PostgreSQL database traffic. Still other network application type identification modules can classify HTTP flows, FTP flows, ICMP flows, RTP flows, NNTP, SMTP, SSL, DICOM and the like. Still further, the network application type identifiers can correspond to a specific network application (e.g., Napster, Citrix, NetIQ, Oracle, Skype, etc.) and more generally to network protocols, protocol suites, and/or services, such as IP, TCP, HTTP, SOAP, XML, UDP, FTP, SMTP, FTP, UDP, etc. In one implementation, inspection module 272 passes pointers to received packets to each network application type identification module, which then inspect the packets stored in the packet buffer memory. In one implementation, each network application type identification module has an associated packet count threshold (in the aggregate, packets from server to client, or client to server) after which it no longer attempts to classify a data flow. In one implementation, the packet count threshold will vary across the network application type identification modules. For example, a network application type identification module dedicated to classifying Citrix® traffic may be able to classify a data flow with certainty after the first three packets. In many instances, application traffic management device 130 may have to encounter more than one packet corresponding to a data flow in order to finally classify the data flow. For example, the initial TCP handshake packets may only reveal IP address, port numbers and protocol identifiers. While this information may be sufficient to identify HTTP traffic, for example, additional packets (such as data packets) may reveal a more specific network application, such as an accounting application or peer-to-peer file sharing application, that utilizes HTTP. Accordingly, in one implementation, each network application type identification module responds to receiving a pointer to a packet by 1) reporting a matching network application type identifier and the desire to inspect more packets in the flow (to possibly identify a more specific network application type identifier); 2) reporting a matching network application type and no interest in inspecting subsequent packets in the flow; 3) reporting no matching network application type identifier and the desire to inspect more packets in the flow; and 4) reporting no matching network application type and no interest in inspecting subsequent packets in the flow.

To facilitate for identification of network application types (e.g., FTP, HTTP, etc.), inspection module 272, in one embodiment, is supported by one to a plurality of network application identification tables in a relational database that allow for identification of a particular network application type (e.g., application, protocol, etc.) based on the attributes of a particular data flow. Of course, other suitable data structures can be used to support the identification of network application types, such as a set of hard-coded instructions, an XML file, and the like. In one embodiment, a network application table including the following fields: 1) network application ID, 2) network application aggregate (if any), 3) name of network application, and 4) network application attributes (e.g., port number, outside IP address, etc. A network application aggregate encompasses a combination of individual network applications (each including different matching criteria, such as different port numbers, etc.) corresponding to the network application aggregate. When inspection module 272 encounters a new flow, the network application type identification modules of inspection module 272 analyze the data flow against the network application attributes in their respective tables to identify a network application ID corresponding to the flow. In one embodiment, inspection module 272 may identify more than one network application associated with the flow. In this instance, inspection module 272 associates the more/most specific network application to the flow. For example, network traffic associated with a peer-to-peer file sharing service may be identified according to a network protocol, such as TCP or HTTP traffic, as well as higher level, application-specific traffic types such as the actual file sharing application itself (e.g., Napster, Morpheus, etc.). In this instance, inspection module 272 associates the flow with the most specific network application. As a further example, an RTSP application data flow can be further classified to RTSP-Broadcast or RTSP-REALNET-TCP in the middle of the flow after a particular signature in the packets is encountered. In one implementation, inspection module 272 writes the identified network application type identifier into the packet wrapper and/or the flow object corresponding to the data flow. Inspection module 272 can also be configured to implement various augmented traffic inspection functionalities. For example, inspection module 272 may include the host probing functionality disclosed in U.S. application Ser. No. 11/019,501 to identify one or more network applications. In addition, inspection module 272 can include the network application identification functionality disclosed in U.S. application Ser. No. 10/917,952.

A.6. Policy Identification and Flow Policy Enforcement Modules

Policy identification module 274 applies a rule set to identify one or more policies to be associated to respective data flows. The policies can correspond to other functional processing modules executed by the same processing unit 132 or other processing units. In one implementation, policy identification module 274 writes the one or more identified policies into the packet wrapper and/or the flow object corresponding to the packet. The rules can be based on explicit attributes of the packets in the data flows, the network application types identified by the inspection module 272, and/or behavioral attributes of the hosts corresponding to the data flows. U.S. application Ser. No. 10/938,435 discloses behavioral attributes associated with hosts that can be used to configure one or more rules. In one implementation, the rules can be configured as "if-then-else" statements, or any other suitable configuration set.

The policies can vary considerably depending on the intended functions of the network device 130. For example, the policies can be applied on a per-flow or aggregate basis. For example, some policies can be configured to control bandwidth utilization across access link 21. Other policies can include discard policies and re-direction policies. A discard policy, for example, causes flow policy enforcement module 276 to discard or drop data packets or flows associated with a particular network application. Other policy types include redirection policies where an inbound request designating a particular resource, for example, is redirected to another server.

Flow policy enforcement module 276 is a flow-level module that is operative to apply one or more policies identified by policy identification module 274 to individual data flows or individual packets. Generally speaking, a flow-level policy is a policy that can be implemented without knowledge of the state of the link and/or other data flows; alternatively, a flow-level policy can be an operation that applies to all or a subset of the packets in a data flow. For example, aggregate bandwidth utilization controls (see below) are generally implemented by link-level modules as they control flows on an aggregate basis relative to various attributes and/or conditions of the access link. In contrast, flow level policies and modules can include actions that apply to individual flows, such as discard policies, that generally speaking do not depend on the state of an access link or other aggregate or link-level information. Flow-level modules can include intrusion detection system (IDS) modules that can abduct packets of a flow from the packet processing path after detecting a possible intrusion. Other flow-level modules can include a flow data record emitter that monitors for the termination of data flows, and generates flow data records for transmission to data collection devices. U.S. application Ser. Nos. 10/676,383 and 11/292,726 disclose the generation and transmission of flow data records. Flow level modules can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention.

A.7. Device Distributor

As discussed herein, after processing at a processing unit 132 configured mainly to execute flow-level operations, a device distributor 240 can be configured to transfer processing to a link-level processing unit. FIG. 6 shows a method, according to one implementation of the invention, executed by a device distributor 240. Similarly to flow distributor 230, a device distributor 240 routes packets to processing units 132 based on network path attributes. For certain functional processes (such as aggregate bandwidth utilization controls), it may be desirable to have the same processing unit operate on all network traffic corresponding to the same egress network interface. FIGS. 8A and 8B illustrate two deployment scenarios for network device 130. Other deployment scenarios are possible. FIG. 8A illustrates network device 130 operably connected between network 50 and router 41 of network 40. As FIG. 8 illustrates, network device 130 includes four network interfaces 138a, 138b, two of which (NIC 2, NIC 3) are connected to different interfaces of router 41, while the other two network interfaces (INT 0, INT 1) are connected to access links 121a, 121b. In one implementation, NIC 2 and NIC 3 are Ethernet network interfaces, while INT 0 and INT 1 are network interfaces appropriate to the access links 121*a*, 121*b*, such as SONET interfaces, IEEE 802.11 interfaces, 802.16 (WiMax) interfaces, and the like. Alternatively, as FIG. 8B illustrates, network device 130 may be deployed between routers 41*a* and 41*b*. In such an implementation, all network interfaces 138 may be the same interface type, such as Ethernet. In either deployment scenario, in one implementation, INT/NIC 0 and NIC 2 are paired by configuration, while INT/NIC 1 and NIC 3 are also paired. Accordingly, packets received at INT/NIC 0 are transmitted from NIC 2, and vice versa. Similarly, packets received at NIC 3 are transmitted from INT/NIC 1, and vice versa. To manage aggregate bandwidth utilization across access link 121*a* (for example), it may be desirable to ensure that a processing unit 132 that includes one or more functional processing modules directed toward this task receive all packets corresponding to this path segment. In one implementation, assuming that different processing units 132 are assigned to different network paths (or network interface pairings, or egress/ingress network interfaces), network device 130 includes configuration information that assigns a specific processing unit to a given network path.

As FIG. 6 shows, when device distributor 240 receives a packet from framework processor 220 (338), it identifies the input network interface corresponding to the packet (in other words, the network interface at which the packet was received) (340). In one implementation, since the input and output network interfaces are paired by configuration, device distributor 240 consults a mapping table that maps the input network interface to a selected processing unit 132 (342). In other implementations, device distributor 240 applies a policy or configuration set that defines the mapping, if any, between network interfaces and processing units 132. Device distributor 240 then transmits the packet (or packet pointer), a hook point identifier, and a processing unit identifier to the message router 136 for routing to the identified processing unit (344). As with the flow distributor 230, device distributor 240 returns an abducted signal or message to the framework processor (346).

As discussed above, in one implementation, network paths are specified relative to pairings of network interfaces. Other implementations are possible, such as assigning link level processing units to a given ingress or egress interface. In one implementation, the mapping may be static or dynamic (if network device is configured with a routing function). For example, network device 130 can be configured with one or more functional processing modules that perform a routing function to select the egress interface for packets. The link level processing unit selected for a given data flow can be assigned based on the ingress interface, the selected egress interface, or the resulting dynamic pairing of the ingress and the egress interface.

A.8. Link Level Control Module

Link level control module 280 broadly refers to a module that performs link level operations, such as rate control and other QoS-related operations. Although the Figures show only a single link-level module, multiple link-level modules may be incorporated into the packet path framework 300. In addition, link level control module 280 can include one or more sub-modules, each directed to a given policy or control type. For example, link level control module 280 can be configured to implement aggregate and per-flow bandwidth utilization controls on one or more access links. As discussed above, a device distributor 240 can be used to route packets to the processing unit 132 and link level control module 280 corresponding to a given access link or network path. For example, as FIGS. 8 and 9 illustrate, a first processing unit 132*c* executing a first link level control module 280 can be assigned to access link 121*a*, while a second processing unit 132*c* executing a second link level control module 280 can be assigned to access link 121*b*.

As discussed above, link level control module 280, in one implementation, can be configured to enforce bandwidth utilization controls (and, in some embodiments, other policies) on data flows traversing access link 21. A bandwidth utilization control for a particular data flow can comprise an aggregate control bandwidth utilization control, a per-flow bandwidth utilization control, or a combination of the two. Aggregate bandwidth utilization controls can be implemented as partitions. Per-flow controls can be explicit rate controls, priority-based controls, or a combination of the foregoing. Still further, link level control module 280 can be configured to implement the bandwidth allocation and control technologies in the co-pending and commonly owned U.S. applications and patents identified above. For example, as disclosed in U.S. Pat. No. 6,038,216, link level control module 280 can be configured to modify TCP parameters to control the rate of inbound packets. Furthermore, link level control module 280 can be configured to implement the partitioning functionality disclosed in U.S. application Ser. No. 10/108,085. Link level control module 280 can use any suitable functionality to enforce bandwidth utilization controls known in the art, including, but not limited to weighted fair queuing, class-based weighted fair queuing, Committed Access Rate (CAR) and "leaky bucket" techniques. Link level control module 280 may incorporate any or a subset of the TCP rate control functionality described in the cross-referenced U.S. patents and/or patent applications set forth above for controlling the rate of data flows.

As to implementing partitions or otherwise scheduling packets for output, link level control module 280, or a sub-module thereof, can be configured to abduct packets received from framework processor (FIG. 13A, 470 and 472), and pass them to an output scheduling process (474). In one implementation, the output scheduling process buffers the packet and emits it at a desired time. As FIG. 13B shows, when a sub-module receives the packet to be emitted (478), it sets the hook point to the next hook point in the packet path framework 300 (in FIG. 7C, HP10 (Device Distributor 240), sets the processing unit identifier (PuID) to the current processing unit and passes the packet to the message router 136. The message router 136 transmits the packet to the processing queue 214, where packet processor 220 re-injects the packet on the packet processing path, passing it to device distributor 240.

A.8.a. Aggregate Bandwidth Utilization Control

An aggregate bandwidth utilization control operates to manage bandwidth for aggregate data flows associated with a class or grouping of data flows. A class or grouping of data flows can be based on one or more rules that simply map data flows having one or more matching attributes—such as network application type, ingress interface, other attributes, and combinations of any suitable attributes—to a given aggregate bandwidth utilization control. An aggregate bandwidth utilization control can be configured to essentially partition the available bandwidth corresponding to a given access link. For example, a partition can be configured to protect a class or grouping of data flows by guaranteeing a defined amount of bandwidth and/or limit a class or grouping of data flows by placing a cap on the amount of bandwidth a class or grouping of data flows can consume. Such partitions can be fixed or "burstable." A fixed partition allows a class or grouping of data flows to use in the aggregate a defined amount of bandwidth. A fixed partition not only ensures that a specific amount of bandwidth will be available, but it also limits data flows associated with that class or grouping of data flows to that same level. A burstable partition allows a class or grouping of data flows to use a defined amount of bandwidth, and also allows that group of data flows to access additional unused bandwidth, if needed. A cap may be placed on a burstable partition, allowing the class or grouping of data flows to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition is created by configuring one or more rules to be applied by policy identification module and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts. In one implementation, a network administrator may configure a hierarchical partition configuration comprising a plurality of nodes, and rules defining to which node a given data flow should be associated. Other configurations are possible as well. For example, U.S. patent application Ser. No. 11/053,596 discloses a partition configuration scheme involving weighting values. U.S. patent application Ser. No. 11/241,007 discloses other suitable mechanisms for configuring partitions.

A.8.b. Per-Flow Bandwidth Utilization Controls

Link level control module 280 is also operative to enforce per-flow bandwidth utilization controls on traffic across access link 21. Whereas aggregate bandwidth utilization controls (e.g., partitions, above) allow for control of aggregate data flows associated with a class or grouping of data flows, per-flow bandwidth utilization controls allow for control of individual data flows. In one embodiment, link level control module 280 supports different bandwidth utilization control types, including, but not limited to, priority policies, rate policies, and discard policies. A priority policy determines how individual data flows are treated relative to other data flows. A rate policy controls the rate of data flows, for example, to smooth bursty traffic, such as HTTP traffic, in order to prevent a TCP end system from sending data packets at rates-higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume.

A.9. Pre-Tunnel, Compression and Tunnel Modules

Figure 14:
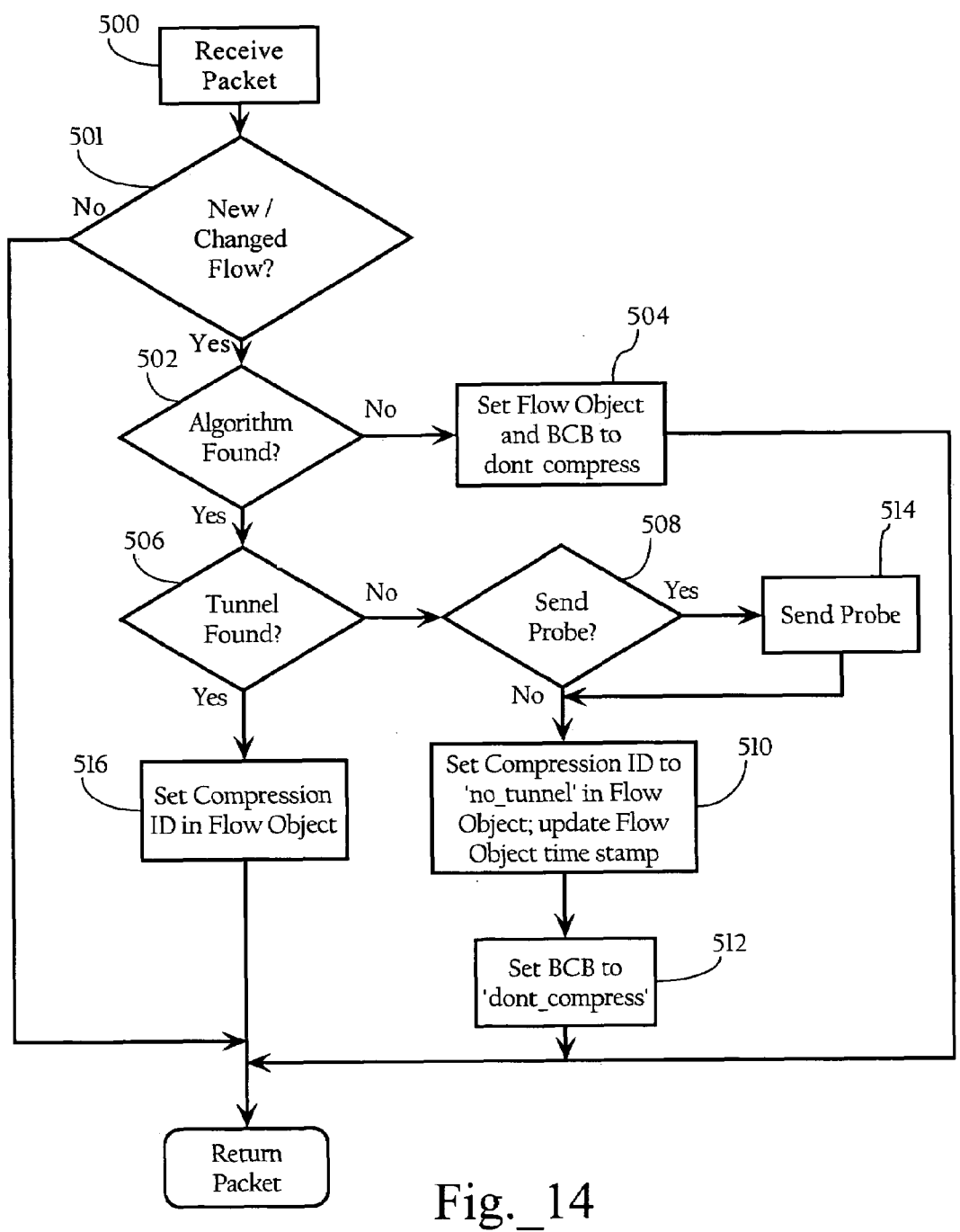
FIG. 14 is a flow chart showing a method directed to operation of a pre-tunnel process according to one implementation of the invention.

Pre-tunnel module 255, in one implementation, performs certain pre-processing, and other steps, related to operation of the compression module 256 and tunnel module 258. For example, pre-tunnel module 255 may determine whether a compression module 256 supports a compression algorithm suitable for the packet. In addition, pre-tunnel module 255 can determine whether a tunnel partner exists for the data flow and conditionally probes the communications path to discover a tunnel partner. FIG. 14 illustrates a process executed by pre-tunnel module 255 according to one possible implementation of the invention. When pre-tunnel module 255 receives a packet (500), it determines whether the packet represents part of a new flow, or represents a change to an existing flow (501). If so, the pre-tunnel module 255 attempts to identify a compression algorithm for the data flow (502). In one implementation, the pre-tunnel module 255 first determines whether data flow has been sufficiently classified or analyzed such that a suitable compression algorithm can be identified for the data flow. As discussed below, compression module 256 may apply different compression algorithms to different types of network traffic. For example, in one implementation, compression module 256 maintains a network application table that identifies the active compression algorithms to be applied to a given network application. In other implementations, selection of compression algorithms can be based on a configurable rule set that includes attributes in addition to, or in lieu of, network application types.

In some implementations, compression module 256 does not compress all types of network traffic. Furthermore, it may take more than one packet to fully determine a network application for a flow and, therefore, to determine whether a compression algorithm can be applied. Accordingly, when a network application is identified, the flow object generally contains a network application type identifier for the network application. The pre-tunnel module 255 uses the network application type identifier to determine whether a corresponding entry exists in the network application table and, if so, sets the active compression identifier in the flow object. Compression identifiers can be used to index into compression entries that contain tunnel partner information, compression encoding information, and the like. If the pre-tunnel module 255 does not find an active compression algorithm for the data flow, it sets the active compression identifier field in the flow object corresponding to the flow, and the active compression identifier in the packet wrapper (BCB) corresponding to the packet, to 'dont_compress' (504). Packets with active compression identifiers set to "dont_compress" are ignored by the compression module 256 and tunnel module 258 and are not sent through a compression tunnel. Otherwise, the pre-tunnel module 255 then determines whether a tunnel partner is available for the data flow (506). If there is no current tunnel that can be used for the flow, the pre-tunnel module 255 determines whether another probe request should be sent along the communications path to the destination host (508, 514). The pre-tunnel module 255 then sets the active compression identifier in the flow object to "no_tunnel" (510), and sets the active compression identifier in the packet wrapper to "dont_compress" (512). If a compression algorithm is identified and a tunnel partner exists, pre-tunnel module sets the active compression identifier to the identified compression algorithm (516).

Compression module 256 is operative to compress packets. In one implementation, compression module 256 receives packets passed to it, conditionally operates on the packets and returns compressed packets to framework processor 220. In one implementation, compression module 256 returns the packet without processing to the framework processor 220, if no compression algorithm is identified in the flow object associated with the packet. Otherwise, compression module 256 returns a compressed version of the packet to the framework processor 220.

In one implementation, the compression module 256 implements the compression and tunnel discovery functionality disclose in U.S. application Ser. Nos. 10/015,826 and 11/082,638. Compression functionality generally transforms data packets from a first state to a second, smaller state. Compatible de-compression functionality is operative to transform the data from the second smaller state to substantially the first state. For example, according to some algorithms and data formats, de-compression does not recover all of the original data. Compression functionality may include a variety of types and protocols. For example, compression module 98 may include a plurality of data compression capabilities, such as compression functionality optimized for different kinds of data (e.g., text files, image files, audio files, etc.) or network application types. A variety of compression algorithms and technologies can be used, such as the run-length encoding (RLE), Huffman encoding, Lempel-ziv compression (e.g., LZ77, LZ78, etc.), Lempel-Ziv-Welch (LZW) compression, fixed library compression, and combinations/variants of the foregoing compression methods. Data transformation can be performed on just the packet data, the header data, or on the entire packet depending on the implementation. In one implementation, compression module 256 may apply different compression techniques to the headers and payloads of individual packets. In addition, compression module 256 can operate on packets individually, or collect packets and transform them on an aggregate basis. In addition, compression module 256 may operate to transform data from one compression format to another compression format, such as converting image data files from one format to another.

Tunnel module 258 is operative to add encapsulating headers to packets to tunnel them to remote nodes on a communications path to destination hosts. In one implementation, tunnel module 258 is also operative to handle the path between the network device 130 and the tunnel partner corresponding to the path, using encapsulation and transport technologies, such as Generic Routing Encapsulation (GRE) protocol (RFC 2890), IP in IP Tunneling protocol (RFC 1853), and/or any other suitable protocol. Tunnel module 258 also includes tunnel management functionality allowing for maintenance of tunnel state information, as well as recovery functionality that handles loss of tunnels, and other transmission errors, such as lost or out-of-order packet transmissions (if applicable to the transformation protocol). Tunnel module 258 is also operative to recognize and handle circumstances where there are multiple paths between two end-systems. In some implementations, pre-tunnel module 255, de-tunnel module 252 and tunnel module 258 may exchange messages and/or share data structures (such as a database of tunnel partner and state information) to implement the functionality described herein. As discussed above, pre-tunnel module 255, de-tunnel module 252 and tunnel module 258 may be combined into a single module having a plurality of hook points on the packet path framework 300.

Other implementations are possible. For example, pre-tunnel module 255, de-tunnel module 252 and tunnel module 258 can operate in connection with other functional processing modules, such as caching modules, encryption modules, protocol or network acceleration modules, all of a variety of types and configurations.

A.10. Transmit Modules

Figure 15:
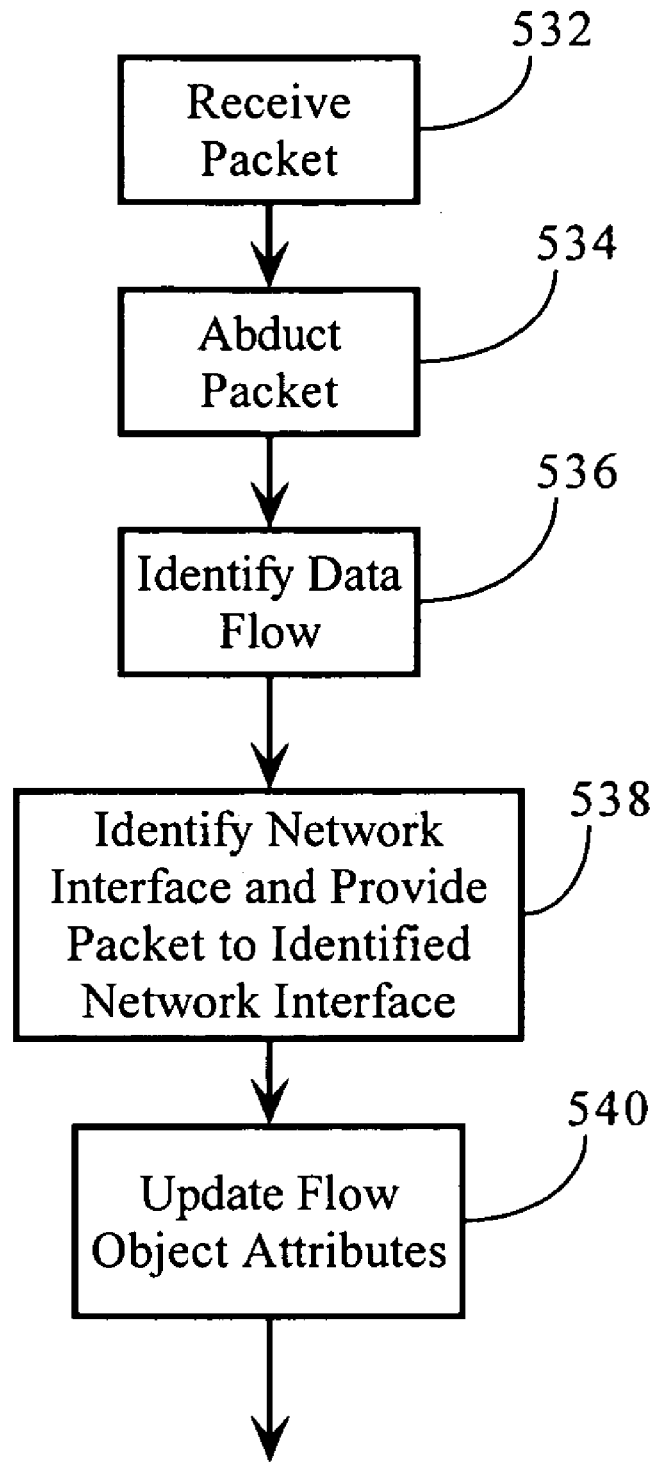
FIG. 15 is a flow chart providing a method directed to operation of a transmit process according to one implementation of the invention.

Transmit module 260, in one implementation, handles one or more operations associated with transmission of packets from the one or more network interfaces 138. As FIG. 15 illustrates, transmit module 260, in one implementation, receives a packet from framework processor 220 (532) and abducts the packet (534), causing framework processor 220 to select the next packet from a selected one of processing queues 214, 216. Transmit module 260 also identifies the data flow corresponding to the packet (534), and identifies the network interface from which the packet is to be transmitted and provides the packet to the identified network interface 138 for transmission (538). Transmit module 536 then updates one or more flow object attributes (540), such as byte count, packet count, latest packet transmission time, etc.

A.11. Other Functional Processing Modules

Other functional processing modules can be incorporated into various parts of the packet path framework. For example, a measurement engine module, or sub-modules, can be included at one or more points in the packet path framework 300. For example, a measurement module can be registered both before and after compression module 256 (and/or de-compression module 254) to enable measurement statistics both before and after compression and/or de-compression operations. In addition, the measurement module may be implemented on a given processing unit, or may be implemented as a stub on a first processing unit that transfers the packet to a corresponding module on a second processing unit. In one implementation, the stub can be configured to abduct the packet, or simply copy the packet, forward the copied packet to the second processing unit and return the original packet to framework processor 220 for further processing.

B. Exemplary Parallel Processing Architectures

The present invention can be implemented on a wide variety of multiple processor architectures. For example, the present invention can be implemented within the context of computing system architecture that includes multiple computing system blades housed in a chassis that includes a backplane interconnect. Alternatively, the present invention can be implemented in a stacked or cluster configuration comprising multiple computing system units (each comprising for example, a motherboard, memory, system bus, processor, and a network interface), interconnected by a switch fabric, such as Ethernet switch or other suitable interconnect. In other embodiments, the present invention can be implemented within the context of a computing system that has a plurality of CPU cores.

B.1. Server Blades & Backplane Interconnect

Figure 16:
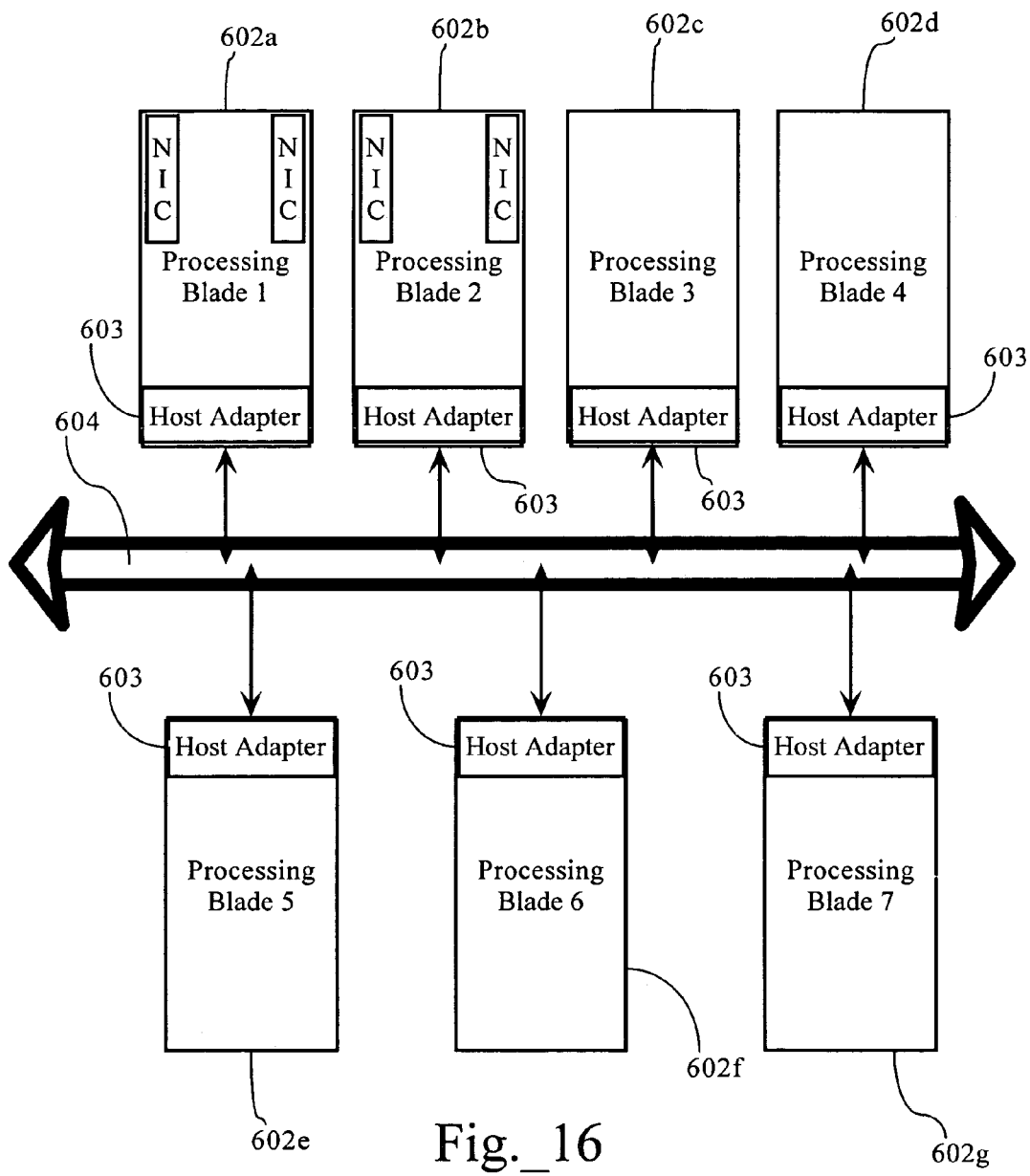
FIG. 16 is a functional block diagram illustrating the overall hardware system architecture into which implementations of the present invention may be incorporated.

FIG. 16 is a functional block diagram illustrating a multiple processing unit hardware architecture, according to one implementation of the invention, that can be used in connection with the functionality described above. As FIG. 16 illustrates, the multiple processor architecture, in one implementation, may comprise a plurality of processing blades 602*a*-*g* interconnected by a backplane 604. Backplane 604, in one implementation, is a switched fabric interconnect. In one implementation, processing blades 602*a*-*g* include host adapters 603 connected to backplane 604 and operative to perform input/output functions. In one implementation, the host adapters 603 and backplane 604 implement the switched fabric I/O standard disclosed in the Infiniband$^{SM}$ Trade Association (IBTA) specification. In one implementation, the functionality of backplane 604 can be incorporated into a chassis assembly adapted to receive a plurality of blade servers.

Figure 17:
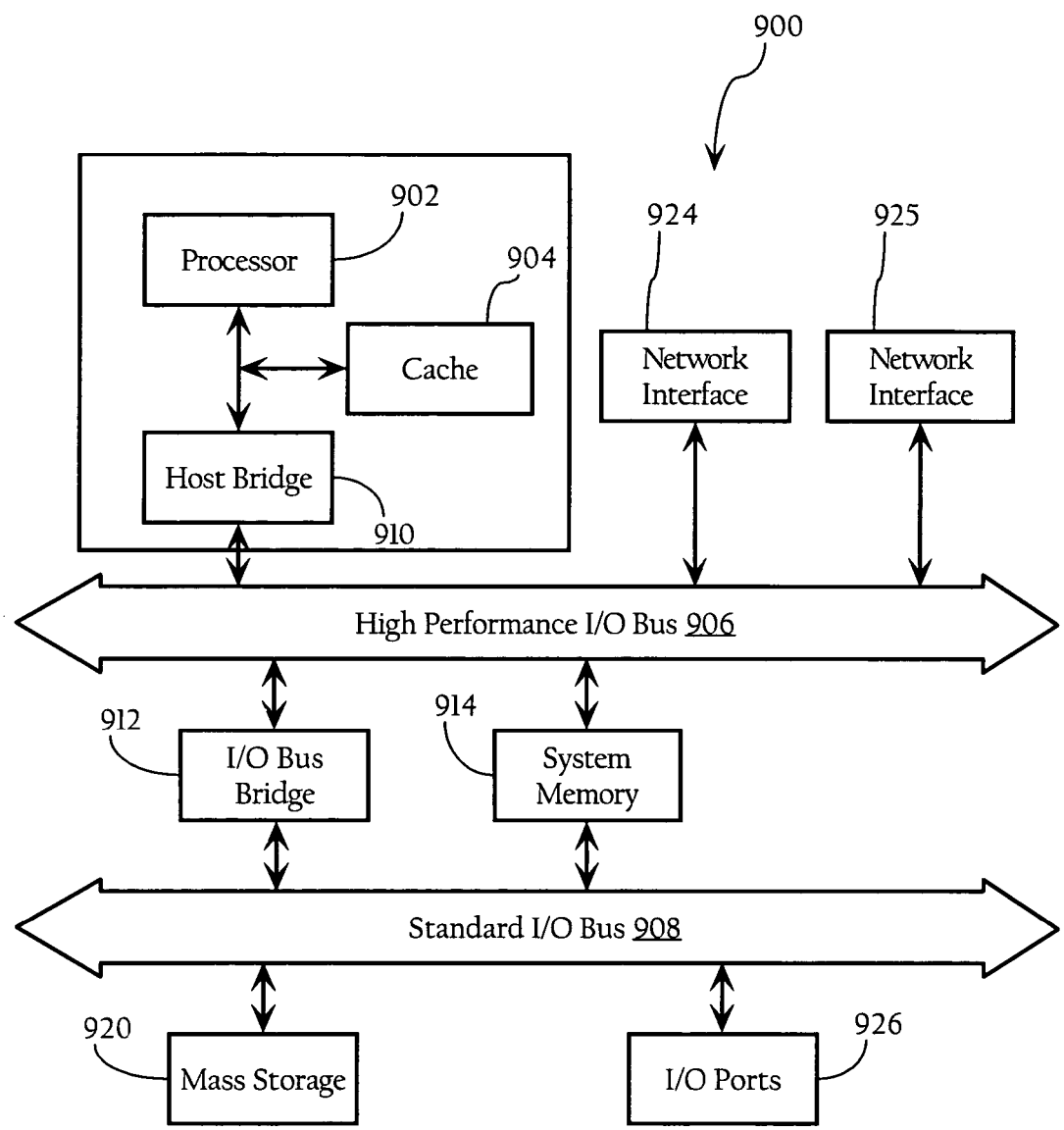
FIG. 17 is a functional block diagram that illustrates components and architecture of a hardware processing blade into which processing unit implementations of the invention can be incorporated.

FIG. 17 is a functional block diagram illustrating the component architecture of a processing blade 900 according to one implementation of the invention. In one implementation, processing blade 900 comprises a processor 902, a system memory 914, network interfaces 924 & 925, and one or more software applications (including one or more of software modules discussed above) and drivers enabling the functions described herein. In addition, the network interfaces 924 & 925 can be wired network interfaces, such as Ethernet interfaces, and/or wireless network interfaces, such as 802.11, BlueTooth, satellite-based interfaces, and the like.

The present invention can be implemented on a wide variety of computer system architectures. For example, FIG. 17 illustrates processing blade 900 having components suitable for processing unit 132 in accordance with one implementation of the present invention. In the illustrated embodiment, the processing blade 900 includes processor 902 and a cache memory 904 coupled to each other as shown. Additionally, the hardware system 900 includes a high performance input/output (I/O) bus 906 and a standard I/O bus 908. Host bridge 910 couples processor 902 to high performance I/O bus 906, whereas I/O bus bridge 912 couples the two buses 906 and 908 to each other. Coupled to bus 906 are network/communication interface 924, and system memory 914. The hardware system may further include a Direct Memory Access (DMA) controller, which is a circuit that allows for transfer of a block of data from the buffer memory of a network interface, for example, directly to system memory 914 without CPU involvement. A variety of direct memory access technologies and protocols can be used, such as standard DMA, first-party DMA (bus mastering), and programmed I/O (PIO). In one implementation, the network interfaces 924, 925 are allocated a DMA channel to the system memory 914 to store packets received at the corresponding interfaces. Coupled to bus 908 are mass storage 920 and I/O ports 926. Collectively, these elements are intended to represent a broad category of computer hardware systems, including but not limited to general purpose computer systems based on the Pentium® processor manufactured by Intel Corporation of Santa Clara, Calif., as well as any other suitable processor.

Other elements of processing blade 900 are described below. As discussed above, at least one of the processing blades 900, in one implementation, comprises one or more network interfaces 924, 925. Network interfaces 924, 925 are used to provide communication between processing blade 900 and any of a wide range of networks, such as an Ethernet (e.g., IEEE 802.3) network, etc. Referring to FIG. 1 (for example), network interface 924 may be connected to router 22 which in turn is connected to one or more access links 21. Network interface 925 may be connected to an element (such as a switch, bridge or router) associated with network 40. Processing blade 900 may contain additional or fewer network interfaces than that shown in FIG. 17. Mass storage 920 is used to provide permanent storage for the data and programming instructions to perform the above described functions implemented by processing blade 900, whereas system memory 914 (e.g., DRAM) is used to provide temporary storage for the data and programming instructions when executed by processor 902. In some implementations, mass storage 920 is provided on a separate device remotely accessible to processing blade over backplane 904. In one implementation, mass storage 920 is located on a remote server or other computing device that includes a target adapter operatively connected to backplane 904. I/O ports 926 are one or more serial and/or parallel communication ports used to provide communication between additional processing blades and other devices connected to backplane 904. In one implementation, I/O ports 926 comprise a host adapter that connects the processing blade to backplane 904. In one embodiment, the host adapter is a host channel adapter implementing the Infiniband specification.

Hardware system 900 may include a variety of system architectures, and various components of hardware system 900 may be rearranged. For example, cache 904 may be on-chip with processor 902. Alternatively, cache 904 and processor 902 may be packed together as a "processor module," with processor 902 being referred to as the "processor core." Furthermore, certain implementations of the present invention may not require nor include all of the above components. For example, the peripheral devices shown coupled to standard I/O bus 908 may be coupled to high performance I/O bus 906. In addition, in some implementations only a single bus may exist with the components of processing blade 900 being coupled to the single bus. Furthermore, additional components may be included in processing blade 900, such as additional processors, storage devices, or memories.

As discussed above, in one embodiment, the operations of the network device 130 described herein are implemented as a series of software routines run by processing blade 900. These software routines comprise a plurality or series of instructions to be executed by a processor in a hardware system, such as processor 902. Initially, the series of instructions are stored on a storage device, such as mass storage 920. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 924. The instructions are copied from the storage device, such as mass storage 920, into memory 914 and then accessed and executed by processor 902. In other implementations, however, one or more aspects of the functionality discussed above can be implemented as firmware, in field programmable gate arrays, and/or in integrated circuits.

An operating system manages and controls the operation of processing blade 900, including the input and output of data to and from software applications (not shown). The operating system provides an interface between the software applications being executed on the system and the hardware components of the system. According to one embodiment of the present invention, the operating system is the LINUX operating system available from such vendors as Red Hat, Inc. of Raleigh, N.C. However, the present invention may be used with other operating systems, such as the Apple Macintosh Operating System, available from Apple Computer Inc. of Cupertino, Calif., UNIX operating systems, Windows® 95/98/NT/XP operating system available from Microsoft Corporation of Redmond, Wash., and the like. Of course, other implementations are possible.

Referring to FIG. 16 and FIG. 9, the processing blades 602*a-g* can be configured to correspond to processing units 132*a-c* illustrated in FIG. 9. For example, processing blades 602*a*, 602*b* can be configured as I/O processing units 132*a*. Processing blades 602*c*, 602*d*, 602*e* can be configured as flow processing units 132*b*, while processing blades 602*f*, 602*g* can be configures as link QoS processing units 132*c*. Furthermore, each processing blade 602*a-g* can be configured to execute an instance of framework processor 220 and message router 136, together with one or more functional processing modules, as discussed above. Transmission of messages between message routers 136; in one implementation, occurs over backplane 604. Of course, the present invention can be used in connection with additional or fewer processing-blades. For example, one processing blade can be configured to execute the functionality of an I/O processing unit 132*a* and a link QoS processing units 132*c*. In addition, network device 130 can be configured to include additional processing blades configured to execute off-line processing or other functionality not associated with the packet processing path.

In addition, FIG. 19 illustrates a stacked or cluster architecture according to one possible implementation of the invention. The stacked or cluster configuration is quite similar to the blade architecture discussed above with the main differences being that one or more Ethernet switches 704 implements the interconnection between separate processing systems 702*a-g*, which are connected to the Ethernet switch(es) via corresponding network interface controllers 703. Of course, other link layer protocols can be used.

B.2. Multiple Processing Cores

Figure 18:
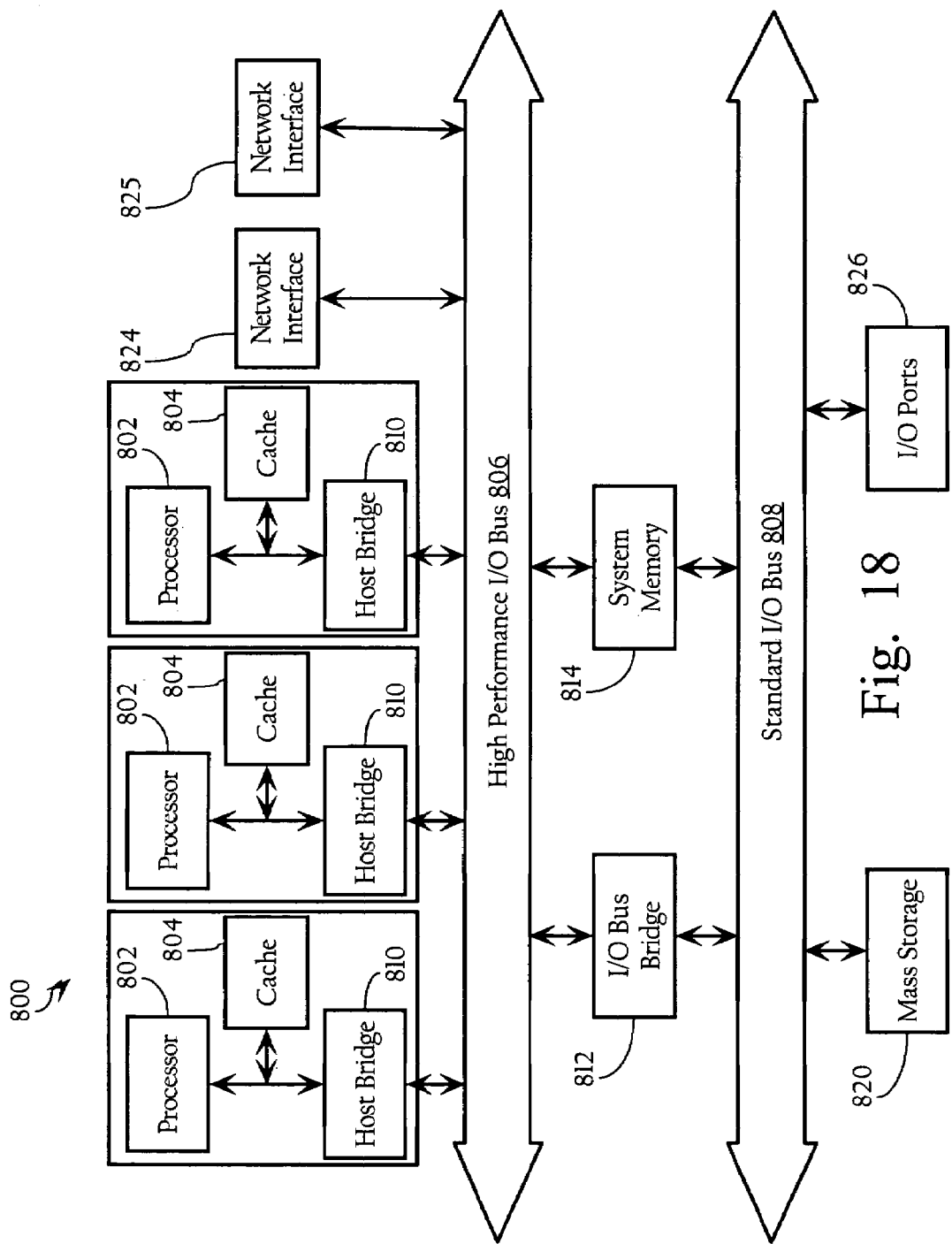
FIG. 18 is a functional block diagram that illustrates components and architecture of a hardware computing system into which implementations of the invention can be incorporated.

FIG. 18 illustrates another exemplary hardware architecture suitable for use in connection with the flow-aware task distribution functionality discussed above. As FIG. 18 illustrates, some implementations of the invention can be incorporated on a computing system having multiple central processing units or cores. In one implementation, network device 130 comprises a multiple processors 802, system memory 814, network interfaces 824 & 825, and one or more software applications and drivers enabling the functions described herein.

The present invention can be implemented on a wide variety of computer system architectures. For example, FIG. 18 illustrates, hardware system 800 having components suitable for network device 130 in accordance with one implementation of the present invention. In the illustrated embodiment, the hardware system 800 includes processor 802 and a cache memory 804 coupled to each other as shown. Additionally, the hardware system 800 includes a high performance input/output (I/O) bus 806 and a standard I/O bus 808. Host bridge 810 couples processor 802 to high performance I/O bus 806, whereas I/O bus bridge 812 couples the two buses 806 and 808 to each other. Coupled to bus 806 are network/communication interfaces 824 and 825, and system memory 814. Coupled to bus 808 are mass storage 820 and I/O ports 826. In addition, the hardware systems may implement cache coherency algorithms to allow for consistency across the cache memories 804 without requiring write operations to system memory 814. Collectively, these elements are intended to represent a broad category of computer hardware systems, including but not limited to general purpose computer systems based on the Pentium® processor manufactured by Intel Corporation of Santa Clara, Calif., as well as any other suitable processor.

As FIG. 18 illustrates, hardware system 800 may include a plurality of single-core processors 802. In other implementations, hardware system 800 may include one or more multiple-core processors. In either implementation, each processor core is associated with an instance of a processing unit 132, including a framework processor 220, message router 136 and one or more functional processing modules. In addition, system memory 814 may be shared across the processor cores. In another implementation, portions of system memory 814 may be allocated to each of the processor cores. The hardware system may further include a Direct Memory Access (DMA) controller, as discussed above. In addition, the hardware system may include Field Programmable Gate Arrays and/or Network processors connected to the I/O Bus 806 or 808 to perform various operations, such as protocol inspection, or flow state management.

Additional elements of hardware system 800 are described below. In particular, network interfaces 824, 825 are used to provide communication between system 800 and any of a wide range of networks, such as an Ethernet (e.g., IEEE 802.3) network, etc. Mass storage 820 is used to provide permanent storage for the data and programming instructions to perform the above described functions implemented in the system controller, whereas system memory 814 (e.g., DRAM) is used to provide temporary storage for the data and programming instructions when executed by processor 802. I/O ports 826 are one or more serial and/or parallel communication ports used to provide communication between additional peripheral devices, which may be coupled to hardware system 800.

Hardware system 800 may include a variety of system architectures, and various components of hardware system 800 may be rearranged. For example, cache 804 may be on-chip with processor 802. Alternatively, cache 804 and processor 802 may be packed together as a "processor module," with processor 802 being referred to as the "processor core." Furthermore, certain implementations of the present invention may not require nor include all of the above components. For example, the peripheral devices shown coupled to standard I/O bus 808 may be coupled to high performance I/O bus 806. In addition, in some implementations only a single bus may exist with the components of hardware system 800 being coupled to the single bus. Furthermore, additional components may be included in system 800, such as additional processors, storage devices, or memories.

As discussed above, in one embodiment, the operations of the network traffic management device 130 described herein are implemented as a series of software routines run by hardware system 800. These software routines comprise a plurality or series of instructions to be executed by a processor in a hardware system, such as processor 802. Initially, the series of instructions are stored on a storage device, such as mass storage 820. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 824. The instructions are copied from the storage device, such as mass storage 820, into memory 814 and then accessed and executed by processor 802.

An operating system manages and controls the operation of system 800, including the input and output of data to and from software applications (not shown). The operating system provides an interface between the software applications being executed on the system and the hardware components of the system. According to one embodiment of the present invention, the operating system is the LINUX operating system available from such vendors as Red Hat, Inc. of Raleigh, N.C. However, the present invention may be used with other operating systems, such as the Apple Macintosh Operating System, available from Apple Computer Inc. of Cupertino, Calif., UNIX operating systems, Windows® 95/98/NT/XP operating system available from Microsoft Corporation of Redmond, Wash., and the like. Of course, other implementations are possible.

The above-described elements can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

A variety of hardware system configurations can be employed. For example, the processing blades 602a-g, the processing systems 702a-f, and/or the hardware system 800 may include specialized hardware systems. For example, the hardware architectures discussed above can include network or content processors, which are hardware based engine that can parses packets and identify packet attributes. Other hardware systems can include hardware-based compression/decompression systems and the like. These specialized hardware devices can be embodied on separate cards, such as a card connected to a PCI or other peripheral slot, or integrated as a chip on a motherboard or network interface card.

Lastly, although the present invention has been described as operating primarily in connection with end systems and networks employing the UDP, TCP and IP protocols, the present invention has application in computer network environments employing any suitable communications protocols. Moreover, one skilled in the art wilt recognize that the present invention can be incorporated into a wide variety of computing system architectures. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. An apparatus, comprising
one or more network interfaces;
a memory;
a plurality of processing units, each processing unit comprising;
  one or more processors;
  one or more processing queues;
  a framework array, stored in the memory, comprising a plurality of hook points, each hook point corresponding to a framework functional module;
  a framework processor module, stored in the memory, comprising instructions operative to cause the one or more processors and the processing unit to
    read a packet from the one or more processing queues;
    starting with the framework functional module corresponding to the hook point identifier associated with the packet, successively invoke the framework functional modules in the framework array to operate on the packet until an invoked framework functional module abducts the packet;
  a message router operative to
    transmit processing of packets to selected processing units;
    place packets received from message routers of the plurality of processing units in a processing queue of the one or more processing queues; and
  a plurality of framework functional modules, wherein, for at least one of the processing units, at least one framework functional module of the plurality of framework functional modules, comprises a flow distributor module, wherein the flow distributor module is operative to
    when invoked by the framework processor module, abduct packets from the framework processor module;
    select processing units to process packets based on data flows the packets belong, wherein two packets belong to the same data flow when the two packets have at least the same source network address, destination network address, and port number, and packets belonging to the same data flow are processed by the same processing unit,
    identify, for packets associated with existing data flows, previously selected processing units, and
    pass packets to the message router for routing to selected processing units.

2. The apparatus of claim 1 wherein the plurality of framework functional modules comprises one or more of a receive module, a de-tunnel module, a de-compression module, a flow update module, an inspection module, a policy identification module, a flow policy enforcement module, link-level control module, a pre-tunnel module, a compression module, a tunnel module and a transmit module.

3. The apparatus of claim 1 wherein, for at least one of the processing units, the plurality of framework functional modules comprises a device distributor module, wherein the device distributor module is operative to
  abduct packets from the framework processor module;
  select processing units to process packets based on one or more network path attributes corresponding to the respective packets; and
  pass packets to the message router for routing to selected processing units.

4. The apparatus of claim 3 wherein the one or more network path attributes comprise one or more of an ingress network interface and an egress network interface.

5. The apparatus of claim 1 wherein at least one of the processing units in the plurality of processing units is an input/output processing unit, and wherein the framework functional modules corresponding to the input/output unit comprise a receive module and a transmit module;
  wherein the receive module is operative to
    parse packets relative to one or more attributes;
    associate packets with respective data flows; and
    populate one or more fields of data structures corresponding to the packets; and
  wherein the transmit module is operative to
    cause packets to be transmitted from a selected network interface of the one or more network interfaces.

6. The apparatus of claim 5 and wherein at least two of the processing units in the plurality of processing units are flow-level processing units, and wherein the framework functional modules corresponding to the flow-level processing units comprise one or more of a flow update module, an inspection module, a policy identification module, a flow policy enforcement module; wherein the flow update module is operative to maintain one or more statistics, metrics and/or variables for respective data flows; wherein inspection module is to identify one or more network applications corresponding to data flows; wherein the policy identification module is operative to identify one or more policies for respective data flows; and wherein flow policy enforcement module is operative to apply one or more policies identified by the policy identification module to individual data flows or individual packets.

7. The apparatus of claim 6 wherein the input/output processing unit comprises a flow distributor module operative to distribute processing of packets to the at least two flow-level processing units.

8. The apparatus of claim 3 and wherein at least two of the processing units in the plurality of processing units are link-level processing units each corresponding to a respective link, and wherein the framework functional modules corresponding to the link-level processing units comprise one or more of a partition module, and a rate control module; wherein the partition module is operative to partition a link into a plurality of virtual links, and wherein the rate control module is operative to apply one or more rate control policies to data flows traversing a link.

9. The apparatus of claim 8 wherein at least one of the processing units comprises the device distributor module operative to transfer processing of packets to selected link-level processing units.

10. The apparatus of claim 1 wherein two or more hook points in the framework array correspond to the same framework functional module in the plurality of framework functional modules.

11. The apparatus of claim 1 wherein the message router is further operative to discover message routers of other processing units.

12. The apparatus of claim 1 wherein one of the processing units of the plurality of processing units contains the one or more network interfaces.

13. The apparatus of claim 1 wherein at least one processing unit of the plurality of the processing units comprises a memory.

14. The apparatus of claim 1 wherein at least one processing unit of the plurality of the processing units is implemented as a server blade.

15. The apparatus of claim 1 further comprising an interconnect communicably coupling the processing units.

16. An apparatus comprising:
a plurality of flow-level processing units each operative to perform one or more operations on data flows traversing a communications path; and
at least one input-output processing unit comprising
at least one network interface for receiving and transmitting packets, and
a flow distributor operative to
identify data flows corresponding to packets;
distribute, based on the identified data flow, processing of the packet to a select processing unit from the plurality of flow level processing units, such that packets belonging to the same data flow are processed by the same processing unit and two packets belong to the same data flow when the two packets have at least the same source network address, destination network address, and port number;
identify a network path attribute corresponding to the packet; and
distribute, based on the identified network path attribute, processing of the packet to a select processing unit from the plurality of processing units of the network device,
wherein at least one of the processing units comprises
a memory;
one or more processors;
one or more processing queues;
a framework array, stored in the memory, comprising a plurality of hook points, each hook point corresponding to a framework functional module;
a framework processor module, stored in the memory, comprising instructions operative to cause the one or more processors and the processing unit to read packets from the one or more processing queues; starting with the framework functional module corresponding to the hook point identifier associated with the packet, successively invoke the framework functional modules in the framework array until an invoked framework functional module abducts the packet;
a message router operative to transmit processing of packets to selected processing units; place packets received from message routers of the plurality of processing units in a processing queue of the one or more processing queues; and
a plurality of framework functional modules.

* * * * *